(12) United States Patent
Leitch et al.

(10) Patent No.: US 9,399,870 B2
(45) Date of Patent: *Jul. 26, 2016

(54) ROOFING SHINGLE SYSTEM AND SHINGLES FOR USE THEREIN

(71) Applicant: Building Materials Investment Corporation, Dallas, TX (US)

(72) Inventors: Olan Leitch, Bakersfield, CA (US); Luis Duque, Hackensack, NJ (US); Ming-Liang Shiao, Collegeville, PA (US); Sudhir Railkar, Wayne, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,538

(22) Filed: Mar. 26, 2015

(65) Prior Publication Data

US 2016/0145869 A1    May 26, 2016

Related U.S. Application Data

(63) Continuation-in-part of application No. 14/550,468, filed on Nov. 21, 2014.

(51) Int. Cl.
*E04D 1/12* (2006.01)
*E04D 1/26* (2006.01)
(Continued)

(52) U.S. Cl.
CPC . *E04D 1/12* (2013.01); *B32B 11/02* (2013.01); *B32B 11/12* (2013.01); *E04D 1/20* (2013.01);
(Continued)

(58) Field of Classification Search
CPC .............. E04D 1/12; E04D 1/26; E04D 1/20; E04D 1/28; E04D 2001/3458; E04D 1/00; E04D 2001/3461; E04D 2001/3491; E04F 13/0864; E04F 13/0862; B23B 11/00; B23B 11/02; B23B 11/12
USPC ........... 52/554, 531, 518, 519, 523, 524, 529; D25/139, 140, 144
See application file for complete search history.

(56) References Cited

U.S. PATENT DOCUMENTS

| 433,279 A | 7/1890 | Fairchild |
|---|---|---|
| 1,295,360 A | 2/1919 | Overbury |

(Continued)

OTHER PUBLICATIONS

CertainTeed Shingle Applicator's Manual: Presidential Shake and Presidential Shake TL, http://www.certainteed.com/resources/PresidentialShakeTLInstall.pdf (undated).

(Continued)

*Primary Examiner* — Joshua J Michener
*Assistant Examiner* — Matthew Gitlin
(74) *Attorney, Agent, or Firm* — Fitzpatrick, Cella, Harper & Scinto

(57) ABSTRACT

A roofing system and roofing shingles for use therein are disclosed. The roofing system comprises a multiplicity of courses of roofing shingles having a headlap portion, a buttlap portion, a lateral leading edge, and a lateral trailing edge, wherein the headlap portion has a width that is less than a width of the buttlap portion defining a reduced-width headlap, wherein the lateral trailing edge of a shingle in a course partially overlaps and partially abuts the lateral leading edge of an adjacent previously installed shingle to form an interlocking edge between adjacent shingles in the course, and wherein the lateral edge includes a trailing edge projection having a weather edge, a rear edge, and a variable breadth that increases toward the rear edge of the trailing edge projection.

22 Claims, 15 Drawing Sheets

(51) Int. Cl.
   *E04D 1/20*      (2006.01)
   *E04D 1/28*      (2006.01)
   *E04F 13/08*     (2006.01)
   *B32B 11/02*     (2006.01)
   *B32B 11/12*     (2006.01)

(52) U.S. Cl.
   CPC .. *E04D 1/26* (2013.01); *E04D 1/28* (2013.01); *E04F 13/0862* (2013.01); *E04F 13/0864* (2013.01)

(56) References Cited

U.S. PATENT DOCUMENTS

| | | | |
|---|---|---|---|
| D56,106 S | 8/1920 | Russell | |
| 1,442,614 A | 1/1923 | Hooker | |
| 1,463,632 A | 7/1923 | Severns | |
| 1,513,940 A | 11/1924 | Smith et al. | |
| D68,552 S | 10/1925 | Sjodahl | |
| 1,584,343 A | 5/1926 | Abraham | |
| 1,587,017 A | 6/1926 | MacInnes | |
| 1,601,735 A | 10/1926 | Harris | |
| 1,604,339 A | 10/1926 | Cumfer | |
| 1,619,599 A | 3/1927 | Cumfer | |
| 1,633,474 A | 6/1927 | Busha | |
| 1,641,858 A | 9/1927 | McCarthy | |
| 1,655,885 A | 1/1928 | Adair | |
| 1,656,434 A | 1/1928 | Gietz | |
| D74,669 S | 3/1928 | Fife | |
| D75,612 S | 6/1928 | Cotner | |
| 1,688,917 A | 10/1928 | Busha | |
| D76,843 S | 11/1928 | Topping | |
| 1,698,891 A | 1/1929 | Overbury | |
| 1,555,441 A | 9/1929 | Sjodahl | |
| 1,732,403 A | 10/1929 | Harris et al. | |
| 1,741,539 A | 12/1929 | Moore | |
| 1,756,741 A * | 4/1930 | Harshberger | E04D 1/26 52/524 |
| 1,760,873 A | 6/1930 | Kirschbraun | |
| D81,768 S | 8/1930 | Topping | |
| D83,704 S | 3/1931 | Stark | |
| 1,828,222 A * | 10/1931 | Clow | E04D 1/22 52/525 |
| D85,639 S * | 12/1931 | Finley | 52/554 |
| 1,842,761 A * | 1/1932 | McCarthy | E04D 1/22 52/527 |
| 1,843,370 A | 2/1932 | Overbury | |
| 1,846,635 A | 2/1932 | Finley | |
| 1,851,088 A | 3/1932 | Duncan | |
| 1,860,899 A | 5/1932 | Miller | |
| 1,862,852 A | 6/1932 | Harshberger | |
| 1,871,646 A | 8/1932 | Abraham | |
| 1,894,614 A | 1/1933 | Wettlaufer | |
| D89,783 S | 5/1933 | Moone | |
| 1,934,666 A | 11/1933 | Goslin | |
| 1,945,485 A | 1/1934 | Harshberger | |
| 1,955,699 A | 4/1934 | Moffit | |
| 1,956,732 A * | 5/1934 | Schulz | E04D 1/26 52/526 |
| D92,504 S | 6/1934 | Topping | |
| 1,968,426 A | 7/1934 | Rowe | |
| 1,975,487 A | 10/1934 | Topping | |
| D93,824 S | 11/1934 | Harshberger | |
| 1,983,936 A * | 12/1934 | Finley | E04D 1/26 52/525 |
| 2,000,226 A | 5/1935 | Fry | |
| 2,006,417 A | 7/1935 | Topping | |
| 2,018,722 A | 10/1935 | Humphrey | |
| 2,027,029 A | 1/1936 | Eckert | |
| D99,248 S | 4/1936 | Piazza | |
| 2,068,118 A | 1/1937 | Topping | |
| 2,078,998 A | 5/1937 | Black | |
| D107,209 S * | 11/1937 | Batell | D25/139 |
| 2,099,131 A | 11/1937 | Miller | |
| 2,106,396 A | 1/1938 | Topping | |
| 2,113,644 A | 4/1938 | Bollaert | |
| 2,132,999 A * | 10/1938 | Topping | E04D 1/26 428/101 |
| 2,161,440 A | 6/1939 | Venrick | |
| 2,205,679 A | 6/1940 | Ames, Jr. | |
| 2,219,450 A | 10/1940 | Koenig | |
| 2,257,152 A * | 9/1941 | Black | E04D 1/125 52/525 |
| 2,272,032 A | 2/1942 | Brown | |
| 2,335,493 A | 11/1943 | Drinkall | |
| 2,411,308 A * | 11/1946 | Washburn | E04D 1/20 52/105 |
| 2,460,353 A | 2/1949 | Killingsworth | |
| 2,487,593 A | 11/1949 | Rowe | |
| 2,687,701 A | 8/1954 | Abraham | |
| 2,699,129 A * | 1/1955 | Abraham | E04D 1/22 52/523 |
| 2,756,699 A | 7/1956 | Lockwood | |
| 2,808,010 A | 10/1957 | Rannikko | |
| 2,858,777 A | 11/1958 | Schuetz | |
| 2,867,180 A | 1/1959 | May | |
| 2,884,878 A * | 5/1959 | Abraham | E04D 1/26 52/525 |
| 3,127,701 A * | 4/1964 | Jastrzemski | E04D 1/20 52/478 |
| 3,217,870 A | 11/1965 | Davis et al. | |
| 3,283,463 A | 11/1966 | Powell | |
| 3,377,761 A | 4/1968 | Skelton, Jr. | |
| 3,407,556 A | 10/1968 | Leibrook | |
| 3,638,388 A | 2/1972 | Crookston | |
| 3,919,223 A | 11/1975 | Zmojdzin et al. | |
| 3,919,823 A | 11/1975 | Bradley | |
| 3,921,358 A | 11/1975 | Bettoli | |
| 4,188,763 A | 2/1980 | Thiis-Evensen | |
| 4,195,461 A | 4/1980 | Thiis-Evensen | |
| 4,274,243 A | 6/1981 | Corbin et al. | |
| 4,333,279 A | 6/1982 | Corbin et al. | |
| 4,434,589 A | 3/1984 | Freiborg | |
| 4,499,702 A | 2/1985 | Turner | |
| 4,527,374 A | 7/1985 | Corbin | |
| 4,587,785 A | 5/1986 | Rohner | |
| 4,637,191 A * | 1/1987 | Smith | E04D 1/26 52/522 |
| 4,666,226 A | 5/1987 | Legrand et al. | |
| 4,856,251 A | 8/1989 | Buck | |
| D317,506 S | 6/1991 | Jenkins et al. | |
| D326,330 S | 5/1992 | Klein | |
| 5,195,290 A * | 3/1993 | Hulett | E04D 1/26 52/518 |
| 5,232,530 A | 8/1993 | Malmquist et al. | |
| 5,239,802 A * | 8/1993 | Robinson | E04D 1/26 52/518 |
| 5,421,134 A | 6/1995 | Hannah et al. | |
| D366,124 S | 1/1996 | Hannah et al. | |
| 5,495,654 A * | 3/1996 | Goodhart | E04D 1/06 29/428 |
| 5,657,603 A * | 8/1997 | Goodhart | E04D 1/06 52/519 |
| D388,195 S | 12/1997 | Hannah et al. | |
| 5,799,459 A * | 9/1998 | Covert | E04D 1/265 156/295 |
| 5,816,014 A | 10/1998 | Tzeng et al. | |
| D400,981 S | 11/1998 | Bondoc et al. | |
| 5,853,858 A | 12/1998 | Bondoc | |
| 5,860,263 A * | 1/1999 | Sieling | E04D 1/26 52/518 |
| D406,361 S | 3/1999 | Bondoc et al. | |
| D406,665 S | 3/1999 | Bondoc et al. | |
| 5,939,169 A | 8/1999 | Bondoc et al. | |
| 6,014,847 A | 1/2000 | Phillips | |
| D426,002 S | 5/2000 | Bondoc et al. | |
| D435,671 S | 12/2000 | Phillips | |
| 6,190,754 B1 | 2/2001 | Bondoc et al. | |
| 6,361,851 B1 * | 3/2002 | Sieling | B32B 3/02 428/141 |
| 6,367,222 B1 | 4/2002 | Timbrel et al. | |
| D480,485 S | 10/2003 | Phillips | |
| D482,141 S | 11/2003 | Rodrigues et al. | |
| D484,992 S | 1/2004 | Rodrigues et al. | |
| 6,708,456 B2 | 3/2004 | Kiik et al. | |

(56) References Cited

U.S. PATENT DOCUMENTS

| | | | |
|---|---|---|---|
| 6,920,730 B2 | 7/2005 | Becker et al. | |
| 6,990,779 B2 | 1/2006 | Kiik et al. | |
| 7,204,063 B2 | 4/2007 | Kandalgaonkar | |
| 7,510,622 B2 | 3/2009 | Kalkanoglu et al. | |
| 7,607,275 B2 | 10/2009 | Elliott et al. | |
| 7,775,008 B2 | 8/2010 | King | |
| D658,787 S | 5/2012 | Westfall et al. | |
| D666,745 S | 9/2012 | Rodrigues et al. | |
| D666,747 S * | 9/2012 | Rodrigues | D25/143 |
| D670,407 S | 11/2012 | Leitch | |
| D670,408 S | 11/2012 | Leitch | |
| D670,409 S | 11/2012 | Leitch | |
| D670,825 S | 11/2012 | Leitch | |
| D670,826 S | 11/2012 | Leitch | |
| D670,827 S | 11/2012 | Leitch | |
| D674,515 S | 1/2013 | Jenkins | |
| D695,925 S | 12/2013 | Ray et al. | |
| 9,057,194 B2 | 6/2015 | Jenkins et al. | |
| 9,242,432 B1 | 1/2016 | Harrington et al. | |
| 2003/0110729 A1 | 6/2003 | Waggoner et al. | |
| 2003/0172611 A1 | 9/2003 | Coco et al. | |
| 2004/0079042 A1 | 4/2004 | Elliott | |
| 2004/0172909 A1 * | 9/2004 | Gabbard | E04D 1/265 52/535 |
| 2004/0182032 A1 | 9/2004 | Koschitzky | |
| 2007/0068108 A1 | 3/2007 | Kiik et al. | |
| 2009/0100788 A1 * | 4/2009 | Gabbard | E04D 1/265 52/745.19 |
| 2009/0151288 A1 * | 6/2009 | Kalkanoglu | B26D 5/34 52/554 |
| 2009/0229210 A1 | 9/2009 | Binkley et al. | |
| 2011/0185668 A1 | 8/2011 | Kiik et al. | |
| 2013/0160389 A1 | 6/2013 | Leitch | |

OTHER PUBLICATIONS

U.S. Appl. No. 14/656,902, filed Mar. 13, 2015 (drawings attached).
Design U.S. Appl. No. 29/520,321, filed Mar. 13, 2015 (drawings attached).
Design U.S. Appl. No. 29/520,322, filed Mar. 13, 2015 (drawings attached).
Design U.S. Appl. No. 29/520,324, filed Mar. 13, 2015 (drawings attached).
U.S. Appl. No. 14/947,220, filed Nov. 20, 2015 (drawings attached).

* cited by examiner

ROOFING SHINGLE SYSTEM AND SHINGLES FOR USE THEREIN

RELATED APPLICATIONS

This application is a continuation-in-part of U.S. Non-Provisional application Ser. No. 14/550,468, filed on Nov. 21, 2014, entitled "Roofing Shingle System and Shingles for Use Therein," which is incorporated herein by reference in its entirety for all purposes within this application.

FIELD OF THE INVENTION

This invention relates to an improved roofing system and roofing shingles that may be utilized in the roofing system. In particular, the invention relates to roofing shingles featuring unique dimensions and a roofing system that utilizes the shingles.

BACKGROUND OF THE INVENTION

Roofing products are often divided into three broad groups: shingles, roll roofing, and underlayment. Shingles and roll roofing typically function as outer roof coverings designed to withstand exposure to weather and the elements. Shingles and roll roofing generally contain the same basic components which provide protection and long term wear associated with asphalt roofing products. These components include a base material made from an organic felt or fiberglass mat which serves as a matrix to support the other components and gives the product the required strength to withstand manufacturing, handling, installation and service in the intended environment. An asphalt coating formulated for the particular service application is often applied to the base material to provide the desired long-term ability to resist weathering and to provide stability under temperature extremes. An outer layer of mineral granules is also commonly applied to the asphalt coating to form a surface exposed to the weather which shields the asphalt coating from the sun's rays, adds color to the final product and provides fire resistance.

Typically, shingles are installed on a roof deck such that the shingles are in a row from left to right and the lateral edges of the shingles in the row are contiguous with each other so as to abut each other, i.e. their lateral edges are adjacent to one another. Each row represents a course and the shingles are applied in overlapping courses on the roof deck, wherein the buttlap portion of a subsequent course is placed on the headlap portion of a previous course. The headlap portion of a conventional shingle is at least as wide as the buttlap portion of the shingle so that when the shingles are installed on a roof deck in overlapping courses, the entire buttlap portion of a subsequent course has headlap beneath it. This manner of installation prevents leakage to the roof deck where the lateral edges of the shingles abut each other.

In a typical roofing system, contiguous shingles in a row abut each other at their lateral edges. Thus, when the shingles are exposed to wet weather, it is possible that leakage can occur at the region where the shingles abut. To prevent that, overlapping subsequent rows of shingles are installed in an offset pattern and each shingle's headlap portion is at least as wide as the buttlap portion. Thus, when the shingles are applied to the roof in a plurality of courses and the buttlap portion of a second course of shingles is laid over the headlap portion of a first row of shingles there is always headlap portion present underneath the regions where the contiguous shingles in a row abut. Any water penetrating the places where lateral edges of shingles abut contacts the underlying headlap rather than the roof deck.

Asphalt shingles are among the most commonly used roofing materials. Asphalt shingles, such as those disclosed in U.S. Pat. No. 6,990,779, have been used extensively in residential housing as roof covering due to their aesthetics, ease of installation, water shedding function, and excellent field performance over a long period of time. U.S. Pat. No. 6,990,779 discloses a laminated roofing shingle system including a reduced-width headlap portion and an interply material that is installed under the buttlap portion in order to compensate for the reduced-width headlap portion and provide protection to the roof deck.

In some cases, prior art shingles may rely on redundant overlapping to ensure adequate water shedding performance, particularly in high wind or wind-driven rain conditions. For example, a typical prior art shingle know as a "3-tab shingle" would require approximately 240 ft$^2$ of sheet material to cover a 100 ft$^2$ of roof area (also known as a "square"). Other types of shingles also require significantly high amounts of overlapping materials to achieve adequate performance for resistance to water infiltration.

Various shingles have been developed that employ a shiplap or side-lap feature such that when applied to a roof deck at least part of the lateral edges of neighboring shingles overlap. U.S. Pat. No. 2,106,396 discloses single layer asphalt coated shingles having serrated edges having edge and corner elements. When the shingles are applied to a roof deck, their lateral edges overlap. The edge and corner elements of the shingles may be utilized as guides for laying the elements of each shingle in proper relation to each other in each course and also for properly relating the elements in one course to those in a subjacent course.

U.S. Pat. No. 2,272,032 describes single layer asphalt roofing shingles with varying cross-sectional thickness to be arranged in offset overlapping courses, wherein the side edge portions of adjacent shingles in the same course overlap. The shingle has longitudinal zigzag edge contours, which shadow each other on either side of the shingle such that the width of the shingle is constant across the length of the shingle. When the courses are installed, the thicker portions of a subsequent shingle "nest" in the thinner portions of the previously installed shingle to provide the protection qualities of more heavily coated roofing material.

U.S. Pat. No. 2,687,701 discloses single layer tabbed asbestos cement roofing shingles comprising projections on the front and rear edges. When the shingles are applied to a roof deck, their lateral edges overlap. The shingles comprise projections which extend above and over the buttlap portion of a previous course when a subsequent course is installed. The overlapping and projections are intended to create a more dimensional appearance.

U.S. Pat. No. 3,919,823 discloses single layer asphalt roofing shingles. The shingles comprise various projections on the front edge. The shingles are installed such that their lateral edges overlap to create what is described as a "shadow effect" which will vary depending on the time of day.

U.S. Pat. No. 4,274,243 discloses a laminated asphalt roofing shingle to be arranged in overlapping courses to optically simulate tiles. The shingle has a buttlap portion with curved tile-like features and the left-most tile-like feature includes an overlap portion that extends over the adjoining edge of a neighboring shingle to hide the adjoining edge between the shingles.

U.S. Pat. Nos. 4,333,279 and 4,527,374 disclose strip or tabbed single layer asphalt shingles. The shingles comprise various edges at least one of which is an alignment edge. The shingles are overlapped using the alignment edge in order to achieve a desired pattern when the shingles are installed on a roof deck.

U.S. Pat. Appl. Publ. No. 2004/0182032 discloses a multi-layer laminate shingle with a reduced-width headlap portion. The shingle has a base layer and at least a second layer above the base layer. At one end of the shingle the base layer projects beyond the second layer while at the other end the second layer projects beyond the base layer. When the shingles are laid in a course along the roof, the projecting end of the second layer overlaps the projecting end of the base layer of the previously installed shingle, forming a shiplap joint over all or substantially all of the width of the shingle.

U.S. Pat. Appl. Publ. No. 2011/0185668 discloses a laminated roofing shingle system including a reduced-width headlap portion, wherein the roofing system comprises a plurality of courses, and wherein a trailing edge of a subsequently installed shingle in a course overlaps the leading edge of an adjacent previously installed shingle in the same course.

In addition to certain of the shingles discussed above, various shingles have employed non-straight edge contours. U.S. Pat. No. 1,732,403 discloses a tabbed strip shingle and method of forming the shingle. The shingles are cut from a sheet of roofing material, wherein the front edge profiles of the shingles are cut with a zigzag pattern to form complementary shingles. The tabs of the shingles are separated by parallel slots and have a generally triangular front edge with a small horizontal tip portion. When installed, the small horizontal tip portion of the tabs of shingles in a subsequently installed course align with the ends of the slots of shingles in a previously installed course. The shingles require approximately 225 ft$^2$ of sheet material to cover a 100 ft$^2$ of roof area.

U.S. Pat. No. 1,846,635 discloses a method of cutting so-called hexagonal strip shingles without waste from a parent sheet of prepared roofing. Each shingle has an exposed edge that defines projecting tongues having three sides of a hexagonal shape separated by recesses. When installed the projecting tongues match with the recesses of previously installed shingles, i.e., the projecting tongues have an end breadth equal to the breadth of the recesses in the buttlap. The shingles may also have a headlap with projections and recesses, wherein the end breadths of the headlap projections are equal to the headlap recesses and different from the tongue end breadths and buttlap recesses. U.S. Pat. No. 1,846,635 further discloses a formula for calculating the average exposed width of the shingle and that the shingle has a maximum width ("extreme width") that is twice the average exposed width plus the desired overlap from a successively installed shingle.

U.S. Pat. Appl. Publ. No. 2003/0172611 discloses shingles having a headlap region and a visual feature region, wherein the visual feature region includes teeth and cutout spaces that are identical in shape and size, with respect to each other. When installed, an alternating pattern is achieved along a vertical line extending up the shingled roof between teeth and cutout spaces of the visual feature regions of overlapped, vertically adjacent shingles.

U.S. Pat. Appl. Publ. No. 2013/0160389 discloses shingles having a headlap portion with a non-straight longitudinal edge and a buttlap portion with a non-straight longitudinal edge, wherein the non-straight longitudinal edges do not shadow each other laterally across the shingle. U.S. Pat. Appl. Publ. No. 2013/0160389 further discloses a roofing system wherein at least a portion of the headlap portion of a shingle in a subsequently installed course overlaps at least a portion of the headlap portion of a shingle in a previously installed course and a maximum headlap overlap dimension is beneath the subsequently installed shingle laterally proximate the openings in the buttlap portion of the subsequently installed shingle. U.S. Pat. Appl. Publ. No. 2013/0160389 further discloses a method of making the shingles wherein the shingles are cut from a sheet of roofing material longitudinally along non-straight lines.

Each of the above-referenced patents and patent applications is incorporated herein by reference in its entirety for all purposes within this application.

SUMMARY OF THE INVENTION

In accordance with the present invention, a roofing system is provided having a multiplicity of courses of roofing shingles having a reduced-width headlap portion wherein a lateral trailing edge of a shingle in a single course partially overlaps and partially abuts an adjacent previously installed shingle to form an interlocking edge between adjacent shingles, and wherein the lateral trailing edge includes a trailing edge projection having a weather edge, a rear edge, and a variable breadth that increases toward the rear edge of the trailing edge projection.

One embodiment of this invention pertains to a new asphalt containing roofing shingle that improves upon the utilization of materials required to make the shingle compared to prior art shingles while providing excellent water shedding and resistance to water infiltration under high wind conditions.

A preferred embodiment of the present invention pertains to a shingle, wherein the shingle has a trailing edge projection having a curved shape to dissipate wind impingements. When installed on a roof deck, the trailing edge projection forms at least part of a side-lap (or shiplap) region. The trailing edge projection in accordance with the invention greatly improves wind performance of the side-lap region.

A further preferred embodiment of the present invention pertains to a shingle, wherein the shingle has a leading edge projection and at least one leading abutment portion that, when installed on a roof deck, abut a trailing abutment portion of an adjacent subsequently installed shingle in the same course. The leading edge projection in accordance with the invention greatly improves resistance to water infiltration underneath a trailing lateral edge of the adjacent subsequently installed shingle.

In a preferred embodiment, a roofing system is provided comprising single-layer shingles having a headlap portion, a buttlap portion, a lateral leading edge, a lateral trailing edge, a straight longitudinal rear edge, and a non-straight longitudinal front edge, wherein the headlap portion has a headlap width that is less than a maximum buttlap width of the buttlap portion, wherein the lateral leading edge includes at least one leading abutting portion and a leading edge projection that extends away from the shingle, wherein the lateral trailing edge includes at least one trailing abutting portion and a trailing edge projection that extends away from the shingle, wherein the roofing system comprises a plurality of courses of the shingles, and wherein the lateral trailing edge of a subsequently installed shingle in a course of shingles partially abuts and partially overlaps the lateral leading edge of an adjacent previously installed shingle in the same course of shingles to form an interlocking edge between adjacent shingles in the same course of shingles, wherein the leading edge projection has a projected edge, a rear edge, and a variable breadth that increases toward the rear edge of the leading edge projection, wherein the trailing edge projection has a weather edge, a rear edge, and a variable breadth that increases toward the rear edge of the trailing edge projection, wherein the leading edge projection mirrors the trailing edge projection, and wherein the straight longitudinal rear edge comprises a leading portion and a trailing portion separated by a central portion, wherein the leading portion consists of the rear edge of the leading edge projection and the trailing portion consists of the rear edge of the trailing edge projection.

In another embodiment, the roofing system consists essentially of the shingles of the invention.

In a preferred embodiment, the lateral leading edge includes one leading abutting portion, wherein the lateral trailing edge includes one trailing abutting portion, wherein the interlocking edge comprises an abutment region defined by an abutment of the leading abutting portion and the trailing abutting portion of the adjacent shingles in the first course of shingles and a side-lap region defined by an overlap of the trailing edge projection and an underlap of the leading edge projection between the adjacent shingles in the first course of shingles In a preferred embodiment, the at least one leading abutting portion includes a first leading portion and a second leading portion that are separated by the leading edge projection, the at least one trailing abutting portion includes a first trailing portion and a second trailing portion that are separated by the trailing edge projection, and the interlocking edge comprises a first abutment region defined by an abutment of the first leading portion and the first trailing portion of the adjacent shingles in the same course of shingles, a side-lap region defined by an overlap of the trailing edge projection and an underlap of the leading edge projection between the adjacent shingles in the same course of shingles, and a second abutment region defined by an abutment of the second leading portion and the second trailing portion of the adjacent shingles in the same course of shingles.

In a preferred embodiment, the trailing edge projection has a curved portion and a straight lateral portion. In a further preferred embodiment, the straight lateral portion has a constant breadth.

In another preferred embodiment, the trailing edge projection has a continuously curved profile. In a further preferred embodiment, the continuously curved profile is convex.

In a preferred embodiment, the variable breadth of the trailing edge projection includes a maximum breadth that is about 3 inches. In another preferred embodiment, the variable breadth of the trailing edge projection includes a maximum breadth that is about 2.5 inches.

In another preferred embodiment, the constant breadth of the straight lateral portion of the trailing edge projection is about equal to the maximum breadth of the trailing edge projection.

In another embodiment, the leading edge projection has a shape that does not mirror the trailing edge projection.

In a preferred embodiment, the leading edge projection has a maximum breadth that is about equal to the maximum breadth of the trailing edge projection.

In a preferred embodiment, the trailing edge projection has a height that spans at least a portion of the headlap portion and at least a portion of the buttlap portion.

In a preferred embodiment, the leading edge projection has a height that is about equal to the height of the trailing edge projection.

In preferred embodiments with one abutment region, the abutment region may have a height of about 3 inches and in another preferred embodiment may be 1.5 inches or 1 inch. In preferred embodiments with two abutment regions, the first abutment region and the second abutment region of the interlocking edge each have a height of about 2 inches. In another preferred embodiment, the first abutment region has a height of about 1 inch and the second abutment region has a height of about 1½ inches. In another preferred embodiment, the first abutment region has a height of about 3 inches and the second abutment region has a height of about 1.5 inches.

In a preferred embodiment, the side-lap region has a maximum breadth that is about 6 inches or about 5 inches.

In a preferred embodiment, the non-straight longitudinal front edge includes a central horizontal portion, a left horizontal portion, a right horizontal portion, a first transition portion, and a second transition portion, wherein the central horizontal portion extends further away from the shingle than the left horizontal portion and the right horizontal portion, and wherein the first transition portion is situated between the left horizontal portion and the central horizontal portion and the second transition portion is situated between the central horizontal portion and the right horizontal portion.

In a preferred embodiment, the shingles further comprise an alignment means. In a particularly preferred embodiment, the alignment means includes sealant strips and the left and right horizontal portions of the non-straight longitudinal front edge.

In a preferred embodiment, the shingles are cut from a sheet of roofing material and the shingles provide a coverage area such that the shingles required to cover 100 ft$^2$ of a roof deck are made from less than 200 ft$^2$ of the sheet of roofing material. In particularly preferred embodiments, the shingles required to cover 100 ft$^2$ of the roof deck are made from about 168 to about 198 ft$^2$ of the sheet of roofing material, and more preferably from about 171 ft$^2$ or about 181 ft$^2$ or about 186 ft$^2$ or about 198 ft$^2$ of the sheet of roofing material. In another preferred embodiment, the shingles required to cover 100 ft$^2$ of the roof deck are made from less than 168 ft$^2$ of the sheet of roofing material.

In a preferred embodiment, the roofing system of the invention provides a reduction in water infiltration area compared to a roofing system employing traditional 3-tab shingles as measured according to Miami Dade TAS 100 wind-driven test by at least 10%. In a further preferred embodiment, the reduction in water infiltration area is by at least 15%. In a particularly preferred embodiment, the reduction in water infiltration area is by at least 20%.

The roofing system of the invention is an improvement of roofing systems known in the art, wherein the improvements are providing roofing shingles having a reduced-width headlap and a unique shape and/or dimensions, which provide an increased coverage for each shingle of the invention compared to prior art shingles and allows for increased utilization of materials necessary to make the shingles of the invention compared to the amount of material necessary to make traditional, prior art shingles.

A further improvement is providing roofing shingles with interlocking edges that provide alignment means upon installation and increased resistance to infiltration by wind-driven rain. A further improvement is providing roofing shingles having a trailing edge projection with variable breadth that when installed on a roof deck in a side-lap fashion dissipates wind impingements at or near the side-lap region.

DETAILED DESCRIPTION OF THE FIGURES

For a more complete understanding of the present invention, and the advantages thereof, reference is now made to the following descriptions taken in conjunction with the accompanying figures, but which are not to be construed as limiting the scope of the present invention as defined by the appended claims, in which:

DETAILED DESCRIPTION

Figure 1A:
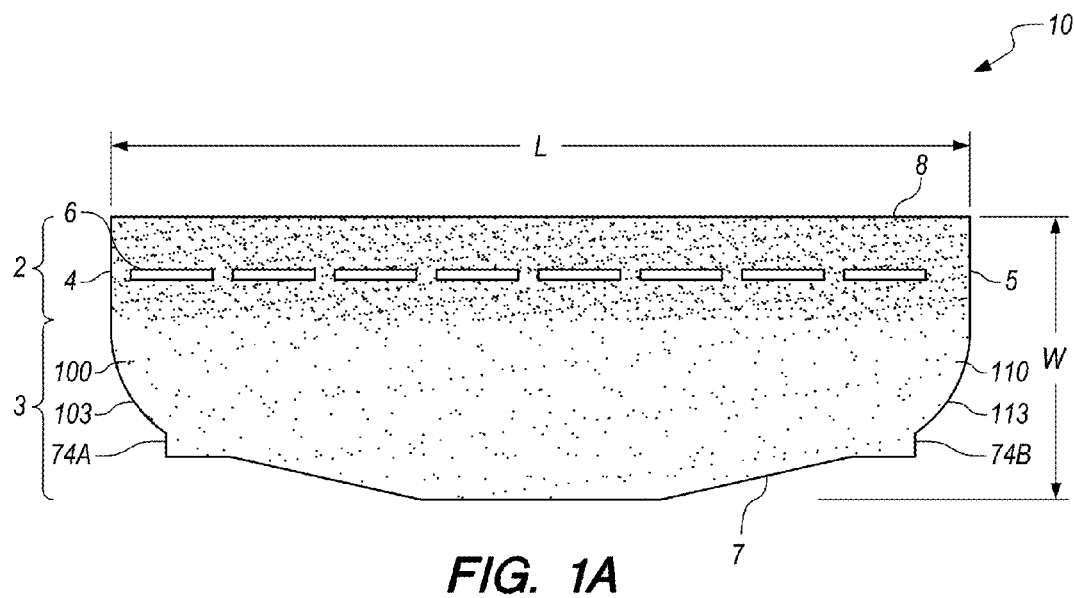
FIG. 1A shows a top plan view of an exemplary embodiment of a roofing shingle of the present invention.

The preferred embodiments of the present invention and its advantages are best understood by referring to FIGS. 1 through 18, like numerals being used for like and corresponding parts of the various drawings.

The first embodiment of the present invention, which relates to single-layer roofing shingles having a trailing edge projection with variable breadth that, when installed in a side-lap (or shiplap) fashion, dissipates wind-impingements at or near the side-lap, will now be described in greater detail by referring to the drawings that accompany the present application.

Figure 1B:
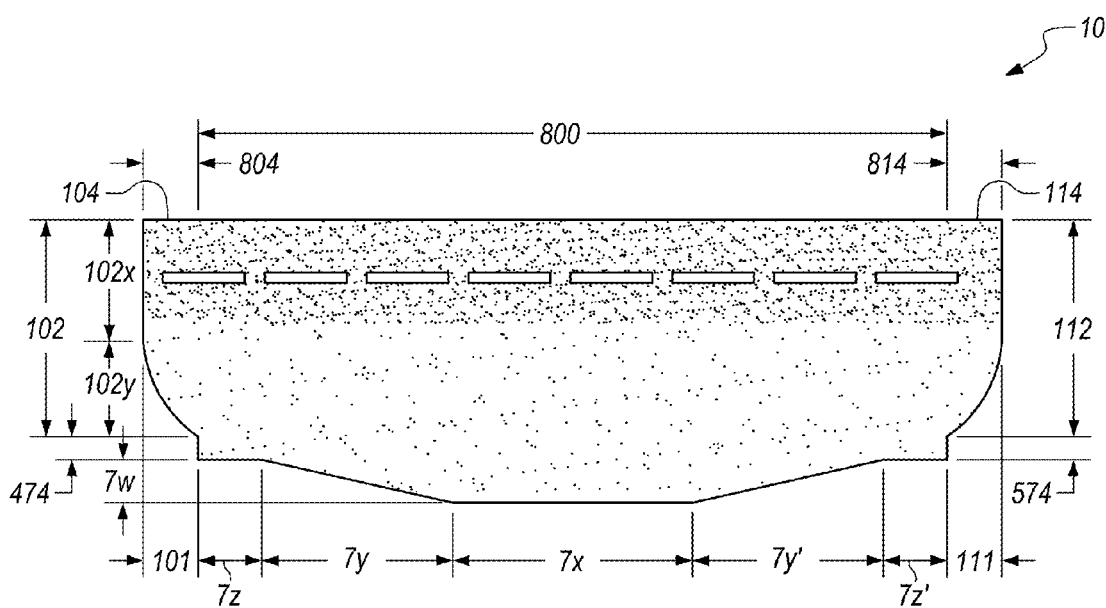
FIG. 1B shows a top plan view of the exemplary embodiment of a roofing shingle of the present invention depicted in FIG. 1A, further illustrating additional dimensions.
Figure 2:
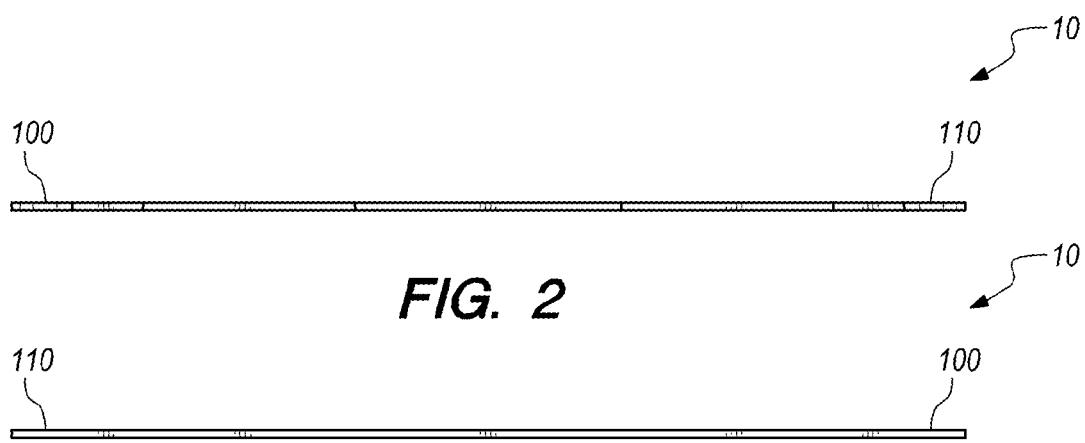
FIG. 2 shows a front elevation view of the exemplary embodiment of the roofing shingle of the present invention depicted in FIG. 1A.
Figure 3:
FIG. 3 shows a rear elevation view of the exemplary embodiment of the roofing shingle of the present invention depicted in FIG. 1A.
Figure 4:
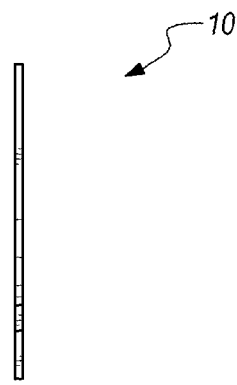
FIG. 4 shows a right side view of the exemplary embodiment of the roofing shingle of the present invention depicted in FIG. 1A.
Figure 5:
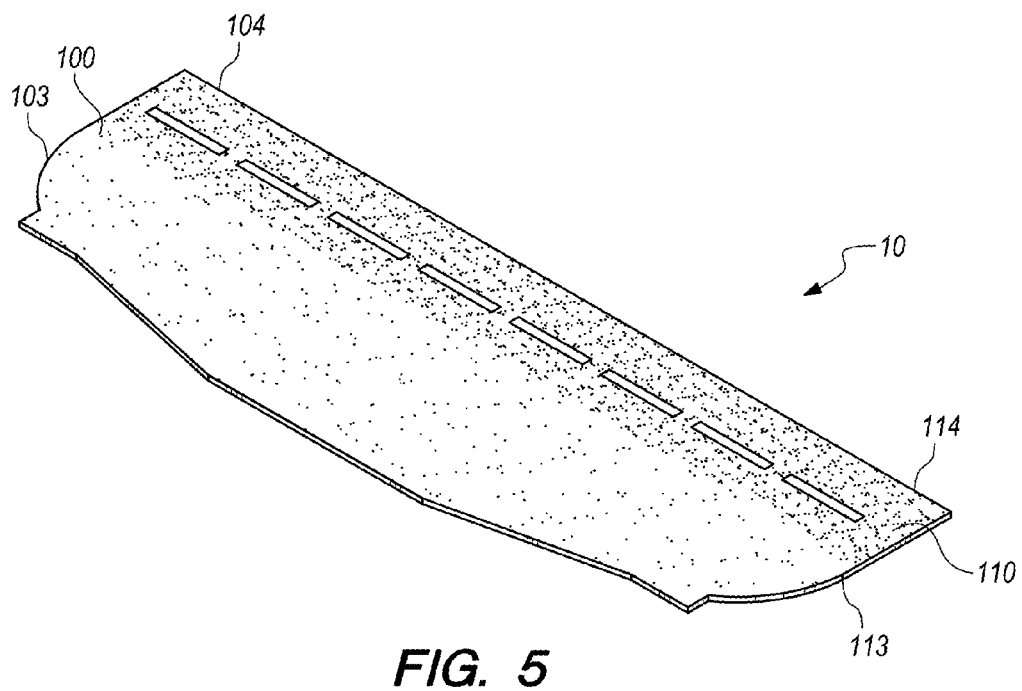
FIG. 5 shows a perspective view of the exemplary embodiment of the roofing shingle of the present invention depicted in FIG. 1A.
Figure 6:
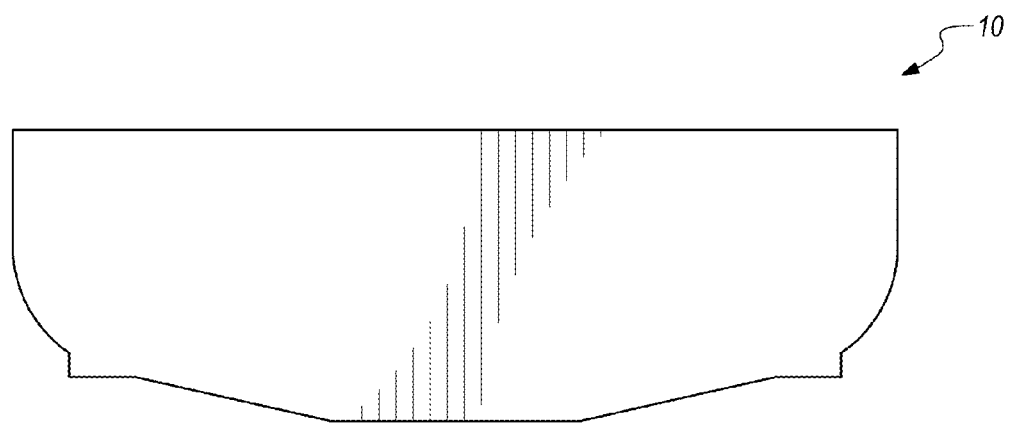
FIG. 6 shows a bottom plan view of the exemplary embodiment of the roofing shingle of the present invention depicted in FIG. 1A.
Figure 7:
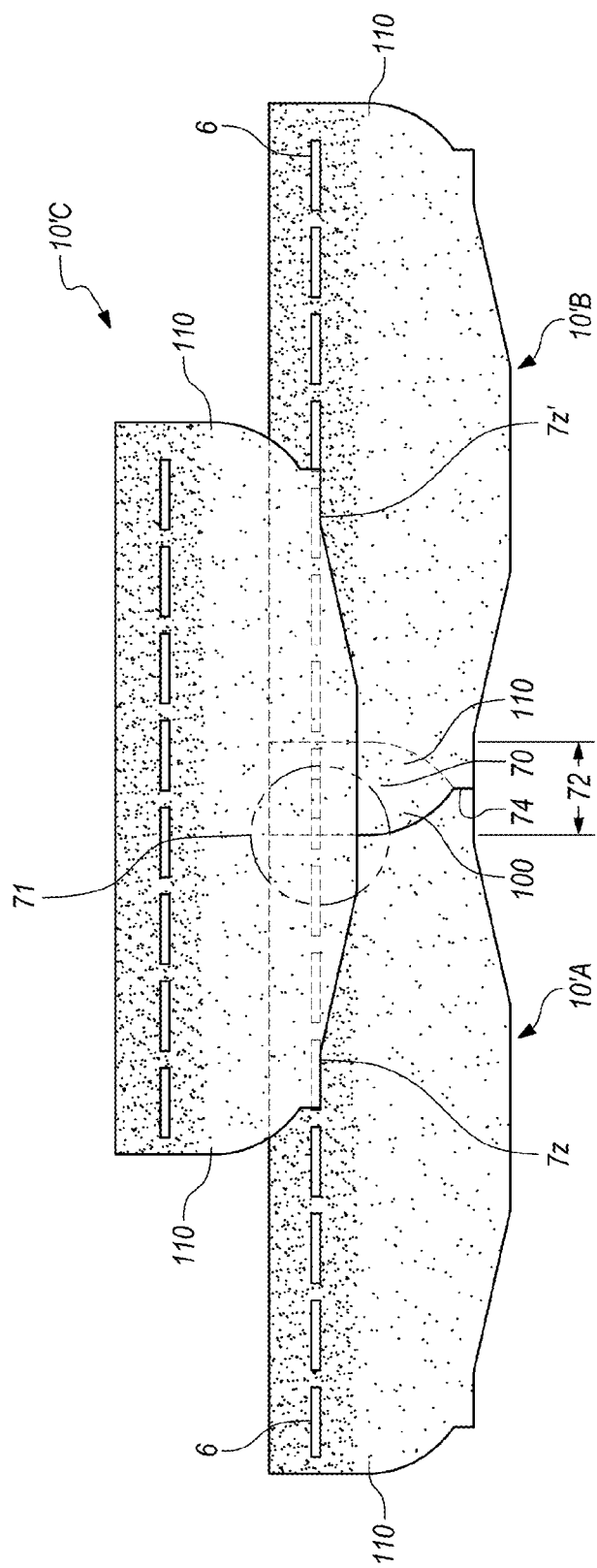
FIG. 7 shows a top plan view of an exemplary embodiment of a roofing system of the present invention incorporating the exemplary embodiment of the roofing shingle of the present invention depicted in FIG. 1A, illustrating overlapped portions of the shingles in broken lines.
Figure 7A:
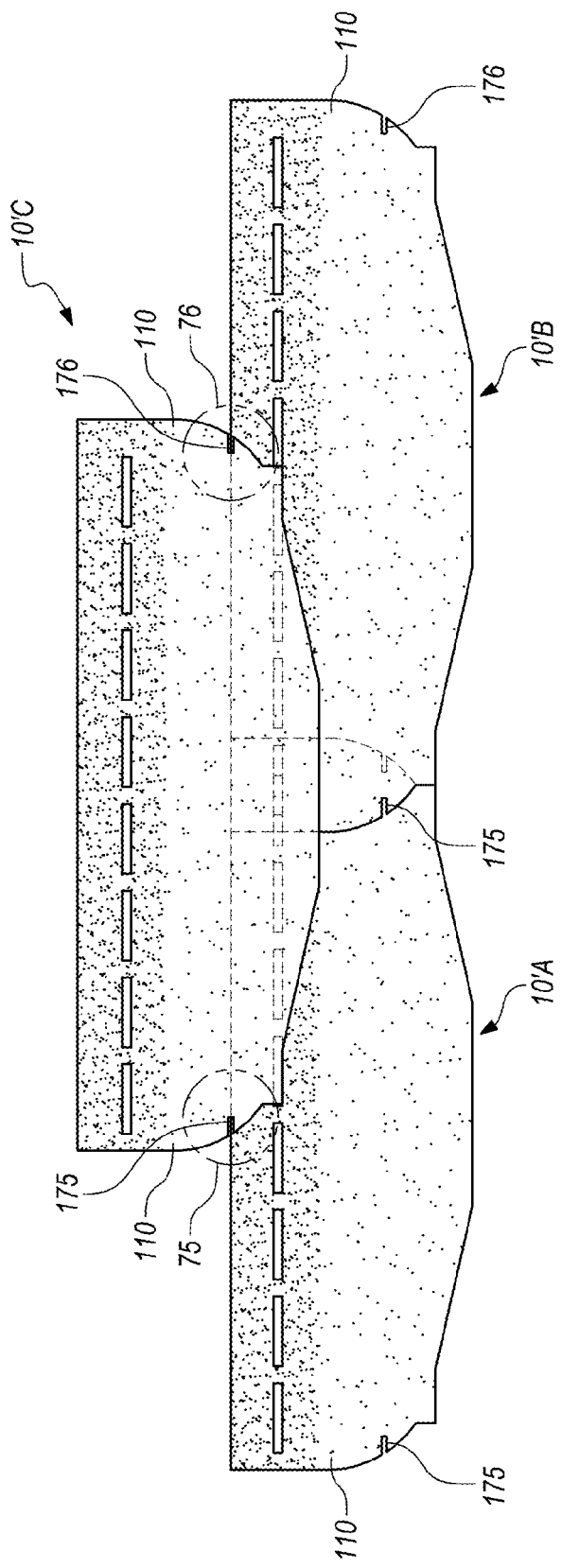
FIG. 7A shows a top plan view of an exemplary embodiment of a roofing system of the present invention incorporating another exemplary embodiment of the roofing shingle of the present invention, wherein the roofing shingles further comprise alignment slits, and illustrating overlapped portions of the shingle in broken lines.
Figure 7B:
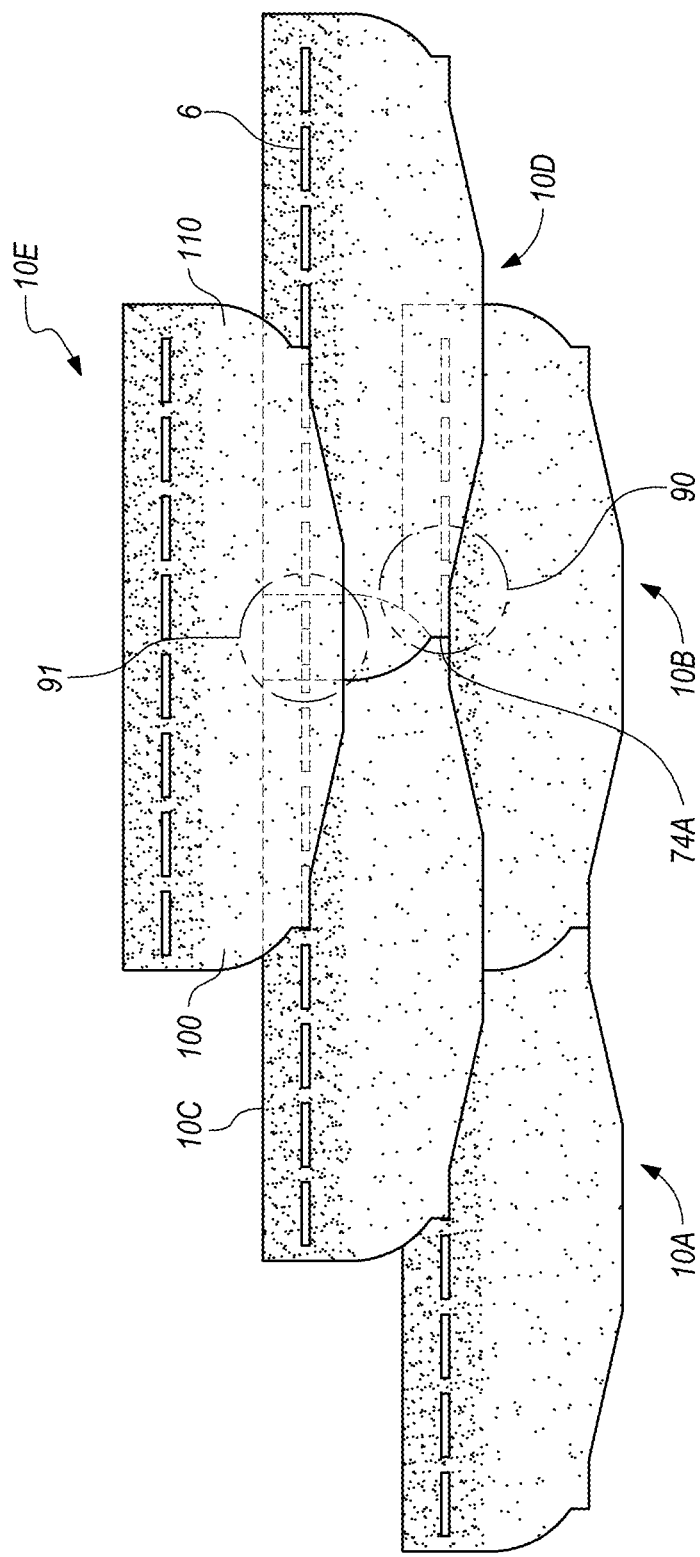
FIG. 7B shows a top plan view of an exemplary embodiment of a roofing system of the present invention incorporating the exemplary embodiment of the roofing shingles of the present invention depicted in FIG. 1A, wherein five shingles are arranged in three overlapping courses, and illustrating overlapped portions of the shingles in broken lines.
Figure 8:
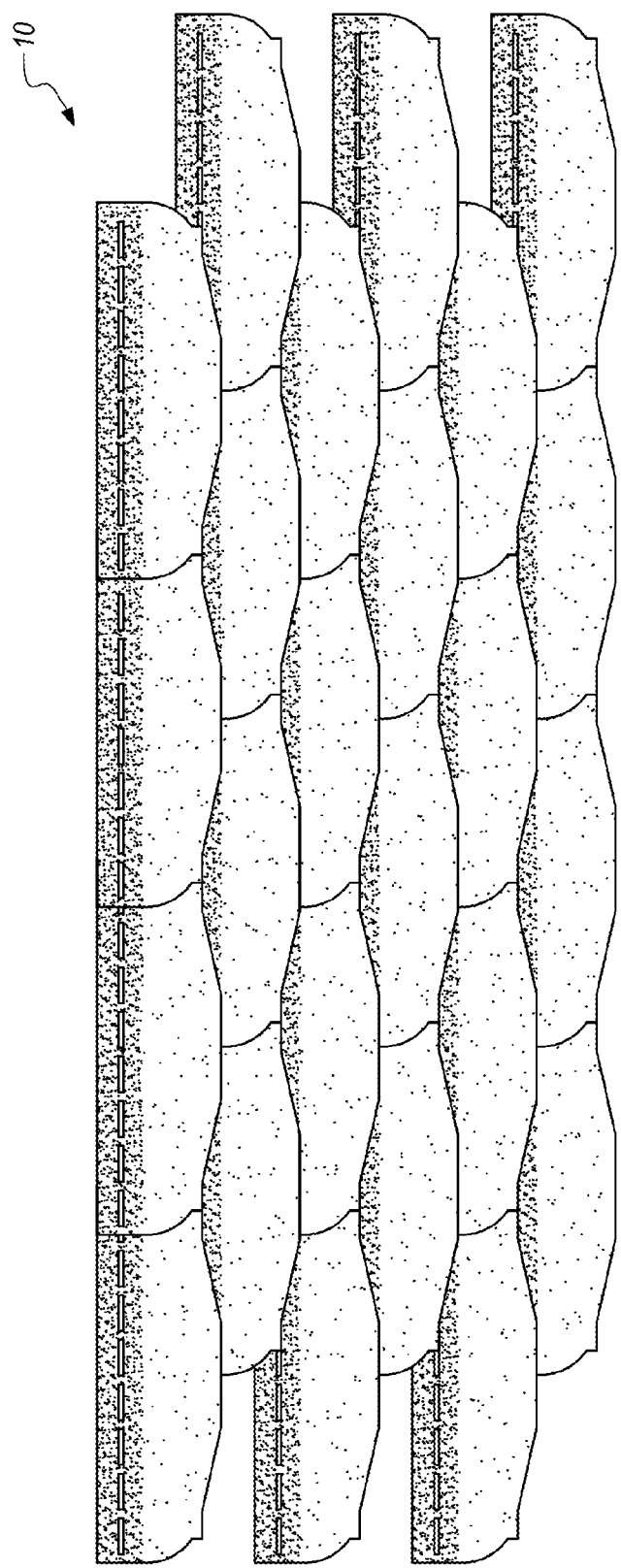
FIG. 8 shows a top plan view of an exemplary embodiment of a roofing system of the present invention incorporating the exemplary embodiment of the roofing shingle of the present invention depicted in FIG. 1A.
Figure 9:
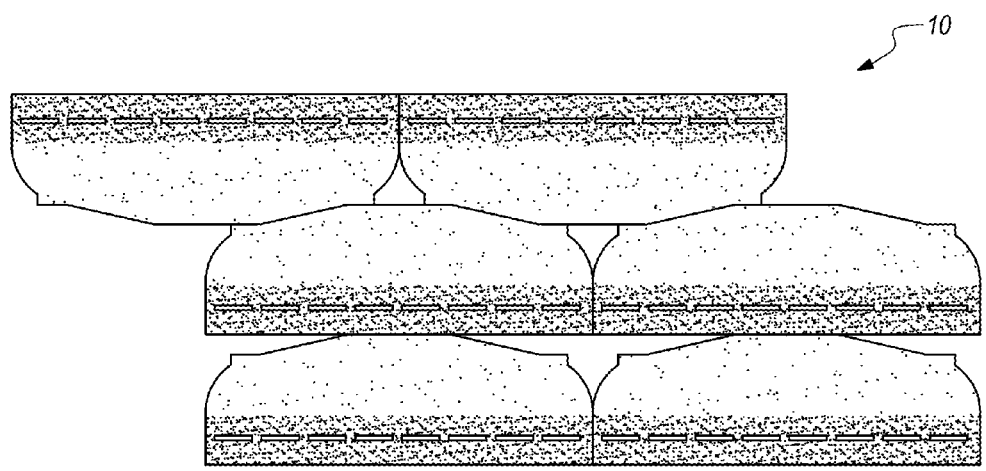
FIG. 9 shows a top plan view of an exemplary sheet of roofing material of the present invention from which groups of three shingles of FIG. 1A may be obtained.
Figure 10:
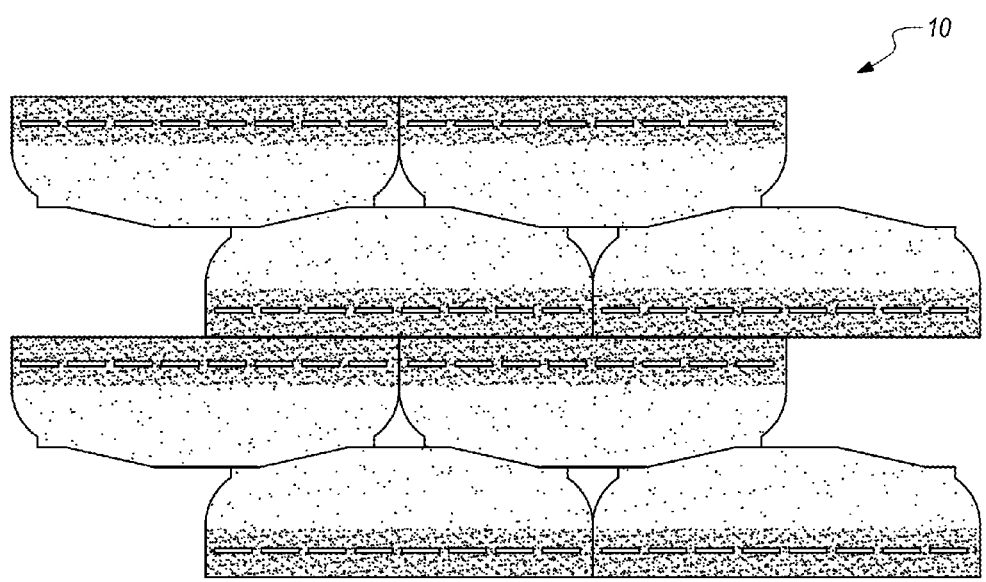
FIG. 10 shows a top plan view of an exemplary sheet of roofing material of the present invention from which groups of four shingles of FIG. 1A may be obtained.

A shingle 10 incorporating one embodiment of the present invention is shown in FIGS. 1A, 1B, 2-10, and 14. FIGS. 1A and 1B illustrate a top plan view of shingle 10. Shingle 10 has a width (w) and a length (l). Shingle 10 comprises a headlap portion 2, a buttlap portion 3, a longitudinal front edge 7, a longitudinal rear edge 8, a lateral leading edge 5, and a lateral trailing edge 4. Lateral leading edge 5 may include a leading portion 74B and a leading edge projection 110. Lateral trailing edge 4 may include a first trailing portion 74A and a trailing edge projection 100. When installed on a roof deck, as illustrated in FIGS. 7, 7B, and 8, the headlap portion 2 of a previously installed shingle 10 is covered by at least a portion of the buttlap portion 3 of a subsequently installed shingle 10 and, as illustrated in FIG. 7, the trailing edge projection 100 of subsequently installed shingle 10 overlaps (i.e., side-laps) a portion of a previously installed shingle 10. It will further be appreciated that the leading edge projection 110 of previously installed shingle 10 underlaps a portion of subsequently installed shingle 10.

Referring to FIGS. 1A and 1B, trailing edge projection 100 has a weather edge 103, a rear edge 104, a maximum breadth 101, and a height 102, and is situated behind a trailing portion 74A. Preferably, when shingle 10 is installed in accordance with the instant invention, at least a portion of the weather edge 103 of trailing edge projection 100 is exposed to weather and the rear edge 104 of trailing edge projection 100 is covered by a subsequently installed shingle in a subsequent course of shingles. Preferably, the maximum breadth 101 may be between 1 and 5 inches, and more preferably about 3 inches or about 2.5 inches or about 2 inches. Preferably, the height 102 may be between 50% and 93% of the width (w) of shingle 10, and more preferably between 70% and 85% of shingle width (w) of shingle 10. In particular preferred embodiments, the height 102 may be about 66% or about 77% or about 79% or about 81% of the width (w) of shingle 10. Trailing edge projection 100 further has a variable breadth (measured transversely across the trailing edge projection 100 along a line parallel to the longitudinal axis of shingle 10) that increases toward the rear edge 104 of the trailing edge projection 100. In this embodiment, the trailing edge projection 100 has a curved portion with a convex profile and a straight lateral portion, which may have a constant breadth. The variable breadth of the trailing edge projection 100 ranges from 0 inches to the maximum breadth 101. In another embodiment, the trailing edge projection may have a continuously curved and convex profile.

In another preferred embodiment, trailing edge projection 100 may be situated between a first trailing portion 74A and second trailing portion 73A. See, e.g., FIG. 11, shingle 11.

Referring back to FIGS. 1A and 1B, in a particularly preferred embodiment, the straight longitudinal rear edge 8 comprises a leading portion 814 and a trailing portion 804 separated by a central portion 800, wherein the leading portion 814 consists of the rear edge 114 of the leading edge projection 110 and the trailing portion 804 consists of the rear edge 104 of the trailing edge projection 100.

To improve wind resistance, an edge of the side-lap shingle (i.e., the weather edge 103 of the trailing edge projection 100) should be designed in such a way as to optimize the aerodynamic performance of the shingle geometry, such that the propensity of wind uplift at the side-lap corner (or trailing projection 100) is highly reduced or eliminated. An example may comprise a side-lap edge (or a trailing projection 100) having a curved shape that dissipates wind impingements and greatly improves wind performance of a side-lap area.

Leading edge projection 110 has a projected edge 113, a rear edge 114, a maximum breadth 111, and a height 112, and is situated behind a leading portion 74B. Preferably, the maximum breadth 111 may be between 1 and 5 inches, and more preferably about 3 inches or about 2.5 inches or about 2 inches. Preferably, height 112 is between 50% and 93% of the width (w) of shingle 10, and more preferably between 70% and 85% of shingle width (w) of shingle 10. In particular preferred embodiments, the height 102 may be about 66% or about 77% or about 79% or about 81% of the width (w) of shingle 10. In a particularly preferred embodiment, the maximum breadth 111 of the leading edge projection 110 is about equal to the maximum breadth 101 of the trailing edge projection 100 and the height 112 of the leading edge projection 110 is about equal to the height 102 of the trailing edge projection 100. In a preferred embodiment, the leading edge projection 110 may have a variable breadth. In a particularly preferred embodiment, the leading edge projection 110 has a shape that mirrors the shape of trailing edge projection 100. It is also contemplated that the leading edge projection 110 may have a continuously curved and concave profile (not shown). It is further contemplated that the leading edge projection 110 does not have a shape that mirrors the shape the trailing edge projection 100, e.g., the trailing edge projection 100 may have curved profile or partially curved profile and the leading edge projection 110 may have a rectangular shape.

In another preferred embodiment, leading edge projection 110 may be situated between a first leading portion 74B and second leading portion 73B. See, e.g., FIG. 11, shingle 11.

Headlap portion 2 has a width measured laterally across shingle 10 that is less than the width of the buttlap portion 3 measured laterally across shingle 10 defining a reduced-width headlap. Preferably, the width of the headlap portion 2 may be between 15% and 50% of the width (w) of the shingle 10, and more preferably about 25% or about 38% or about 42% of the width (w) of the shingle 10. Headlap portion 2 may include sealant strips 6.

As depicted in the embodiment shown in FIGS. 1A, 1B, 2-10, and 14, shingle 10 of the invention may have a longitudinal front edge 7 that is non-straight. However, the longitudinal front edge of the shingle of the invention may be straight or may have tabs spaced apart by openings. See, e.g., shingles 11, 12, 13 depicted in FIGS. 11, 12, and 13, respectively. Referring back to FIGS. 1A, 1B, 2-10, and 14, shingle 10 of the invention may have a non-straight longitudinal front edge 7 that has a central horizontal portion 7x, a left horizontal portion 7z, a right horizontal portion 7z', a first transition portion 7y, and a second transition portion 7y', wherein the central horizontal portion extends further away from the shingle than the left horizontal portion and the right horizontal portion (as identified as dimension 7w), and wherein the first transition portion is situated between the left horizontal portion and the central horizontal portion and the second transition portion is situated between the central horizontal portion and the right horizontal portion.

Figure 11:
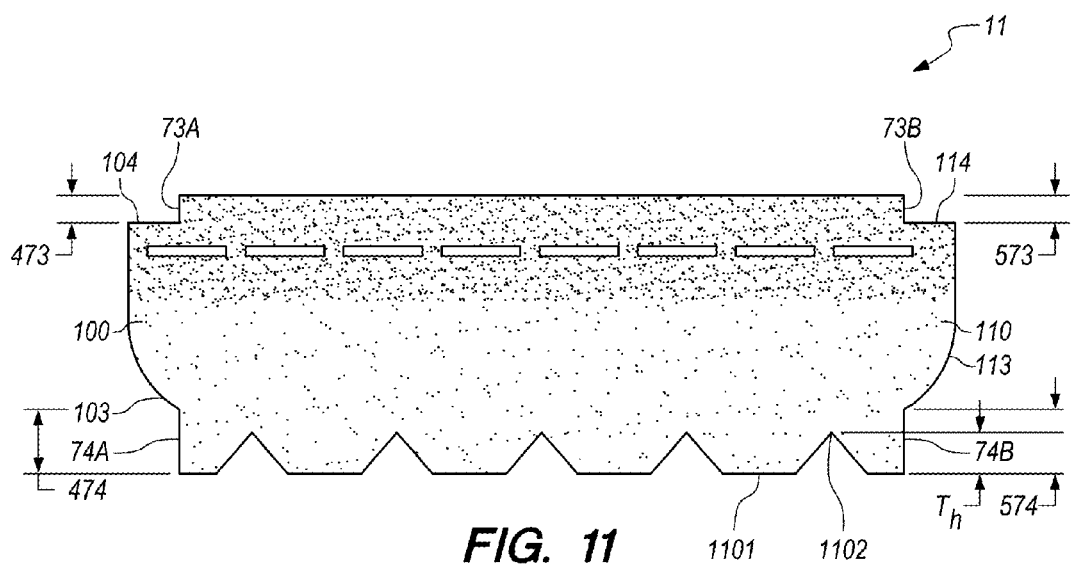
FIG. 11 shows a top plan view of a second exemplary embodiment of a roofing shingle of the present invention.
Figure 12:
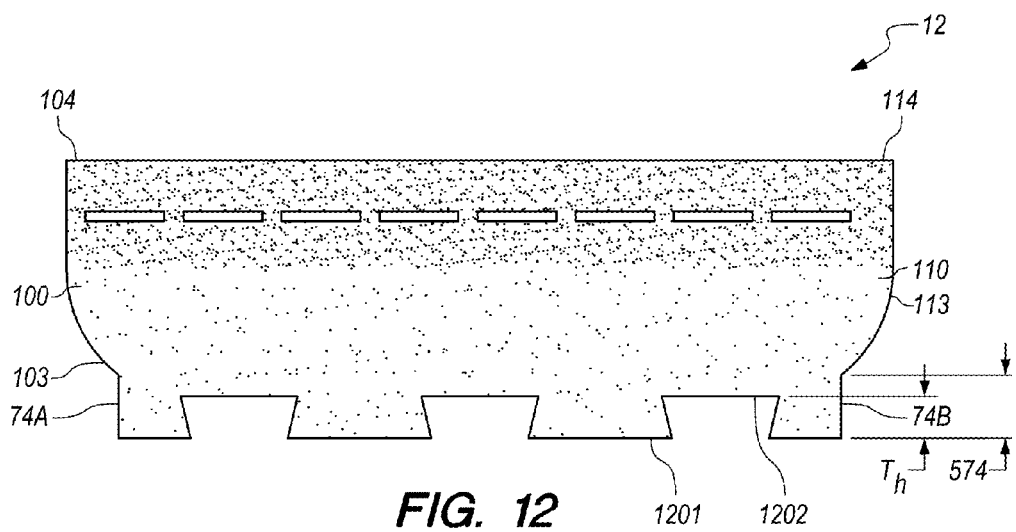
FIG. 12 shows a top plan view of a third exemplary embodiment of a roofing shingle of the present invention.
Figure 13:
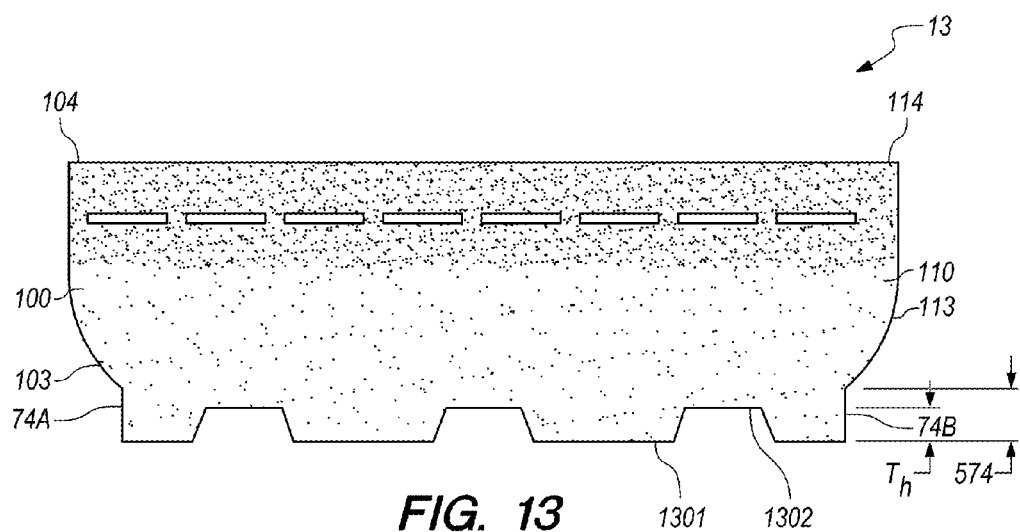
FIG. 13 shows a top plan view of a fourth exemplary embodiment of a roofing shingle of the present invention.

As depicted in FIGS. 1A, 1B, 2-10, and 14, shingle 10 may have an undivided buttlap. However, in other preferred embodiments, the buttlap portion may include a plurality of tabs spaced apart by a plurality of openings. The openings may have a triangular shape or a trapezoidal shape. Referring to FIG. 11, shingle 11 has a buttlap portion that includes a plurality of tabs 1101 spaced apart by a plurality of triangular shaped openings 1102. Referring to FIG. 12, shingle 12 has a buttlap portion that includes a plurality of tabs 1201 spaced apart by a plurality of trapezoidal shaped openings 1202. It will be appreciated that the non-parallel edges of the trapezoidal shaped openings 1202 are formed by adjacent tabs 1201 and the trapezoidal shape of the openings narrow as the tabs 1201 extend away from the shingle 12. However, the openings may have an inverted trapezoidal shape, i.e., wherein the openings widen as the tabs 1301 extend away from the shingle 13. See, e.g., FIG. 13, feature 1302. Preferably, the tabs may have a height (see, e.g., FIGS. 11, 12, 13 dimension $T_h$) of about ½ inch to about 2.5 inches, and more preferably about 1.5 inches or about 2 inches. Furthermore, the principles of the instant invention may further be employed in laminated shingles (not shown).

Figure 14:
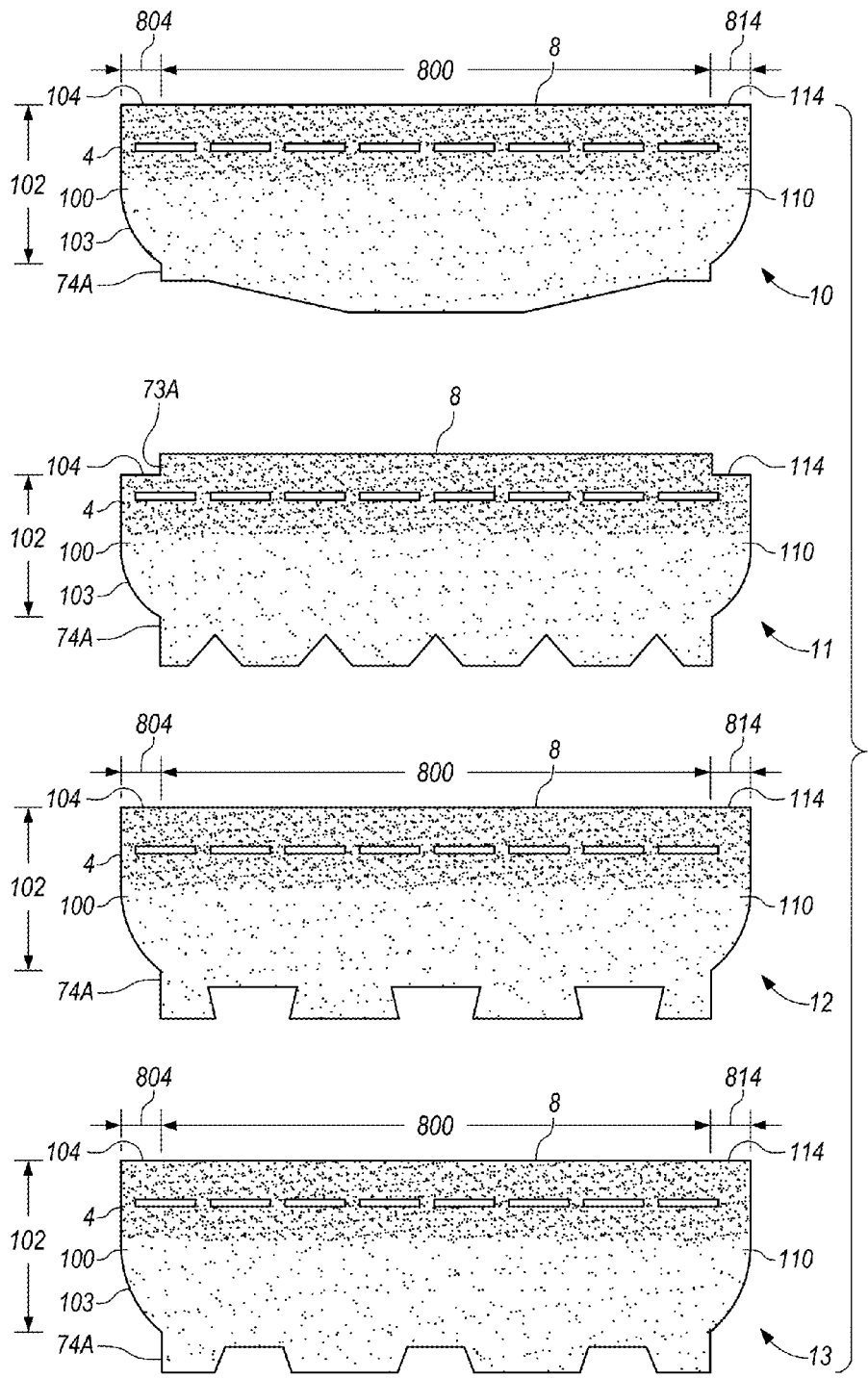
FIG. 14 is a composite figure illustrating the shingles depicted in FIGS. 1A, 11, 12, and 13.

An important feature of the present invention is the lateral trailing edge 4 comprising at least one trailing abutting portion 74A and a trailing edge projection 100 having a weather edge 103, a rear edge 104, and a variable breadth that increases toward the rear edge of the trailing edge projection. As depicted in FIG. 14, in some embodiments, the height of the trailing edge projection 100 extends to the longitudinal rear edge 8 of the shingle, wherein the rear edge 104 of the trailing edge projection 100 forms the trailing portion 804 of the longitudinal rear edge 8 of the shingle. See, e.g., FIG. 14, shingles 10, 12, and 13. In other embodiments, the height of the trailing edge projection 100 does not extend to the longitudinal rear edge 8 of the shingle, wherein the trailing edge projection 100 is situated between a first trailing abutting portion 74A and a second trailing abutting portion 73A. See, e.g., FIG. 14, shingle 11. In such embodiments, the rear edge 104 of the trailing edge projection 100 does not form a portion of a straight longitudinal rear edge.

FIG. 7 depicts a particularly preferred roofing system embodiment of the present invention, wherein three shingles 10A, 10B, 10C of the invention are installed as they would be applied to a roof deck in the same course, such that the trailing edge projection 100 of a subsequently installed shingle 10B overlaps a portion of a previously installed shingle 10A providing a first part of side-lap region 70 and the leading edge projection 110 of a previously installed shingle 10A is underneath (or underlaps) a portion of a subsequently installed shingle 10B providing a second part of side-lap region 70, wherein side-lap region 70 has a maximum breadth 72. It will be appreciated that the maximum breadth 72 of the side-lap region 70 is equivalent to the sum of the maximum breadth 101 of the trailing edge projection 100 and the maximum breadth 111 of the leading edge projection 110. Preferably, the maximum breadth 72 may be between 2 and 10 inches, and more preferably between 4 and 6 inches. In particular preferred embodiments, the maximum breadth 72 may be about 4 inches or about 5 inches or about 6 inches.

Preferably, as depicted in FIG. 7, two shingles 10A and 10B of the invention partially abut each other at an abutment region 74. Referring back to FIG. 1A, shingle 10 of the invention has a trailing portion 74A that, when installed as in FIG. 7, abuts a leading portion 74B of a previously installed shingle in the same course to define the abutment region 74.

Referring back to FIGS. 1A and 1B, the trailing portion 74A has a height 474 and the first leading portion 74B has a height 574. In a preferred embodiment, heights 474, 574 of first trailing portion 74A and first leading portion 74B, respectively, are about equal and may be between 0.5 and 4 inches, and more preferably are about 1 inch. In another preferred embodiment, heights 474, 574 may preferably be about 2.5 inches or about 3 inches. In yet another preferred embodiment, heights 474, 574 are preferably about 2 inches.

Figure 15:
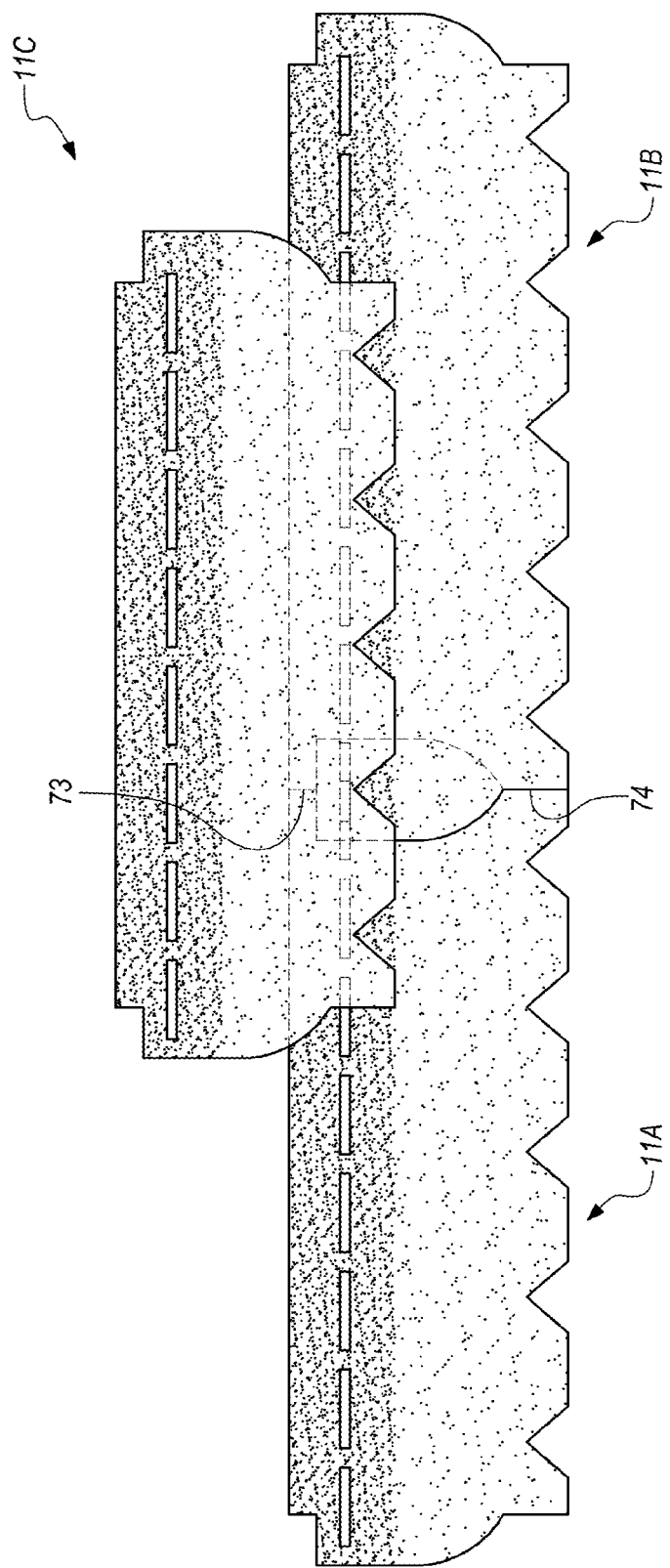
FIG. 15 shows a top plan view of an exemplary embodiment of a roofing system of the present invention incorporating the exemplary embodiment of the roofing shingle of the present invention depicted in FIG. 11, illustrating overlapped portions of the shingles in broken lines.
Figure 16:
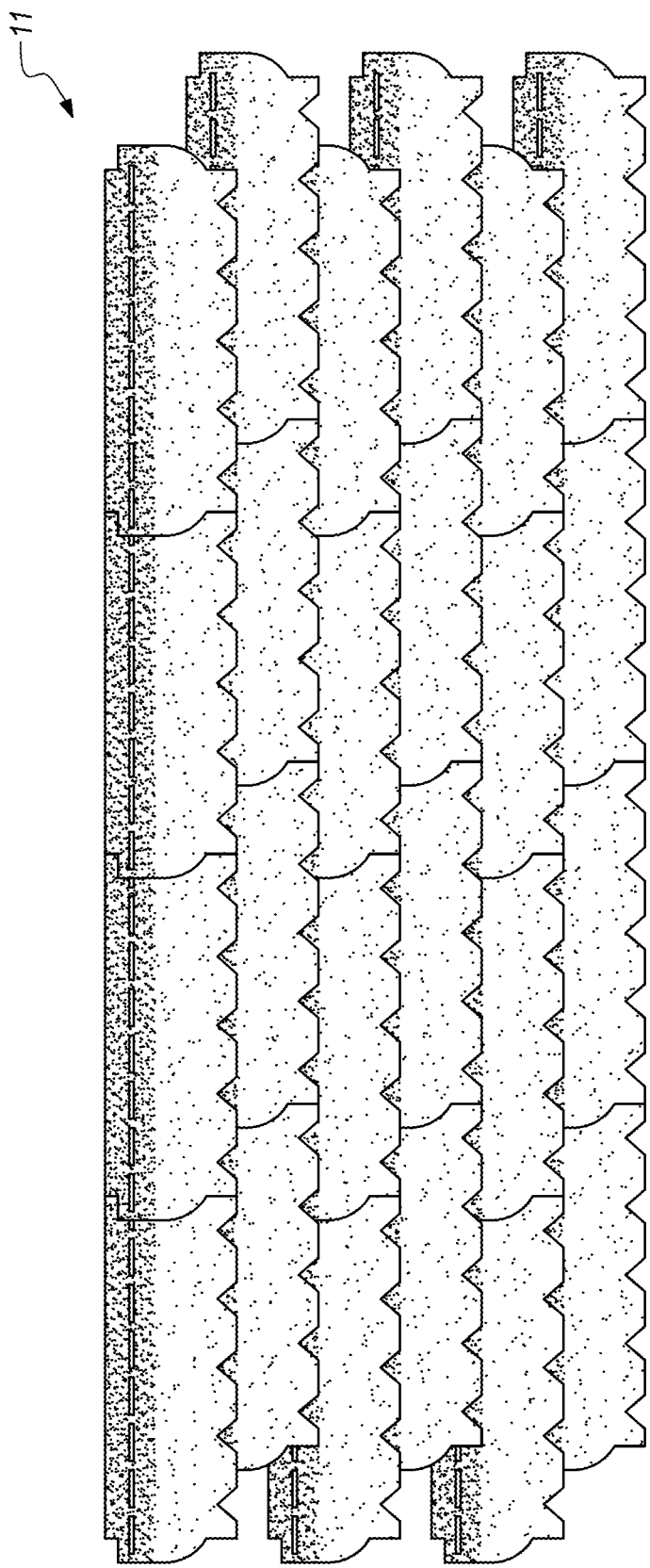
FIG. 16 shows a top plan view of an exemplary embodiment of a roofing system of the present invention incorporating the exemplary embodiment of the roofing shingle of the present invention depicted in FIG. 11.
Figure 17:
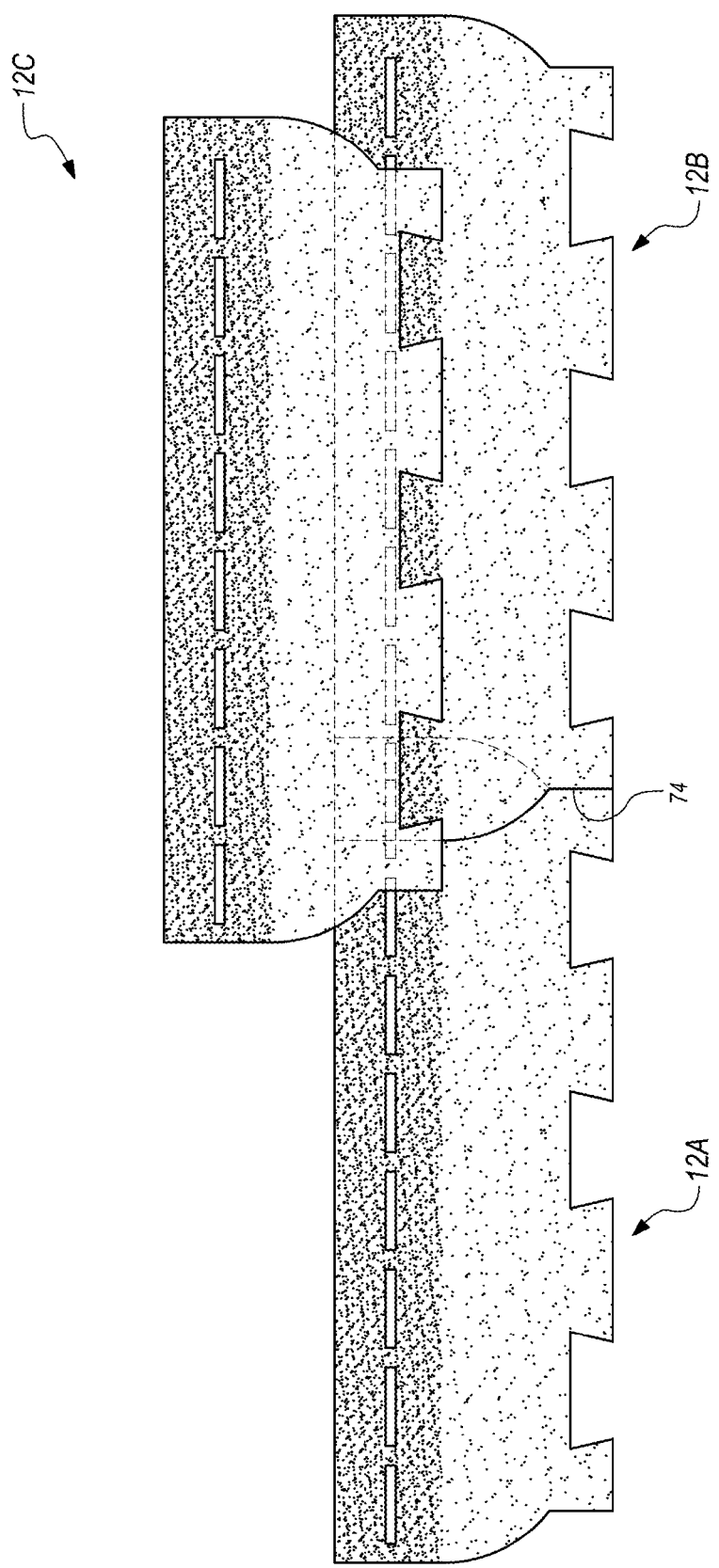
FIG. 17 shows a top plan view of an exemplary embodiment of a roofing system of the present invention incorporating the exemplary embodiment of the roofing shingle of the present invention depicted in FIG. 12, illustrating overlapped portions of the shingles in broken lines.
Figure 18:
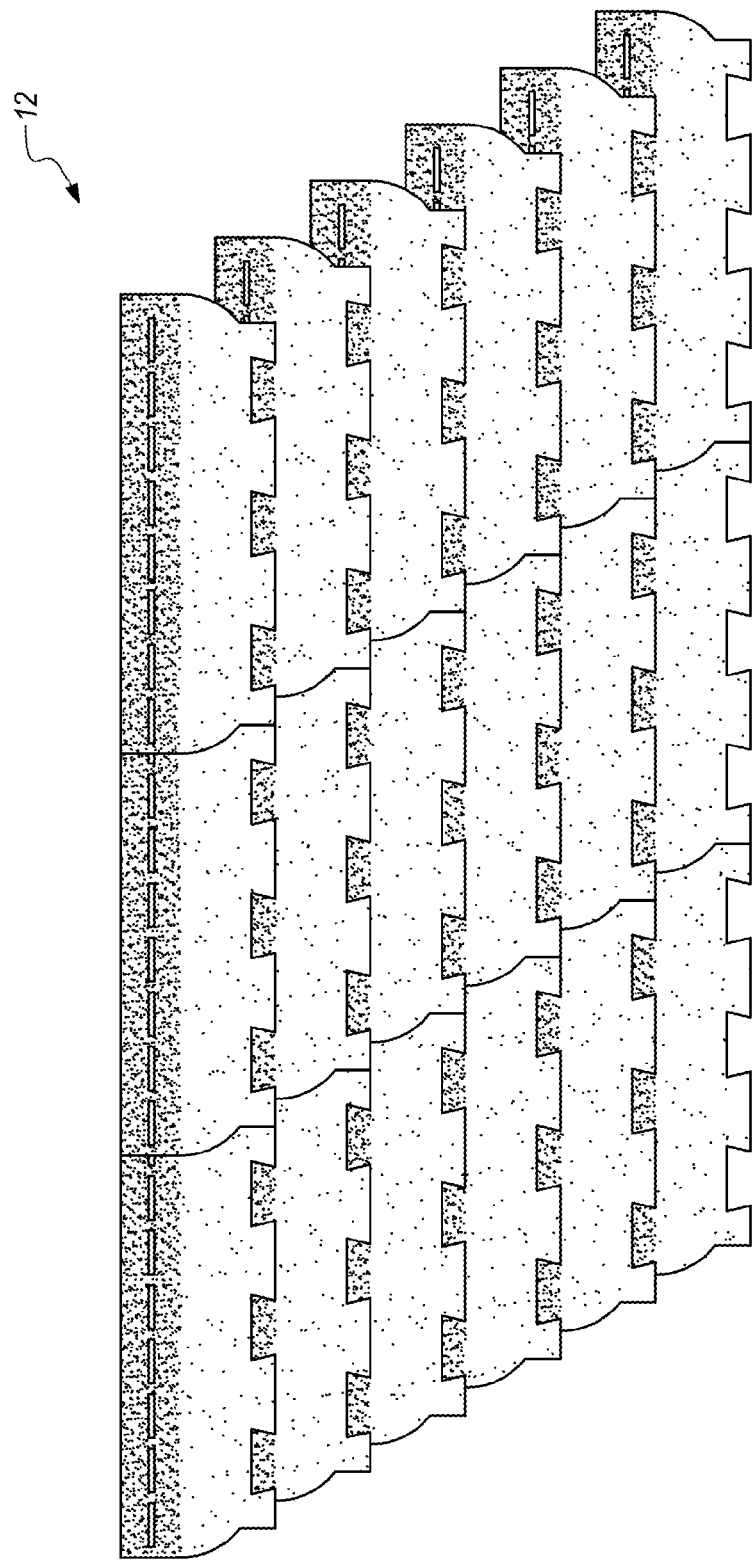
FIG. 18 shows a top plan view of an exemplary embodiment of a roofing system of the present invention incorporating the exemplary embodiment of the roofing shingle of the present invention depicted in FIG. 12.

In another preferred embodiment, as depicted in FIG. 15, two shingles 11A and 11B of the invention partially abut each other at a first abutment region 74 and a second abutment region 73. Referring to FIG. 11, shingle 11 of the invention has a first trailing portion 74A that, when installed as in FIG. 15, abuts a first leading portion 74B of a previously installed shingle in the same course to define the abutment region 74. Shingle 11 of the invention also has a second trailing portion 73A that, when installed as in FIG. 15, abuts a second leading portion 73B of a previously installed shingle in the same course to define the second abutment region 73. In a further preferred embodiment, heights 473, 573 of second trailing portion 73A and second leading portion 73B, respectively, are about equal and may be between 0 and 4 inches, and more preferably are 2 inches. In another preferred embodiment, heights 473, 573 are preferably 1½ inches. In a particularly preferred embodiment, heights 474, 574, 473, 573 are about equal.

Preferably, shingle 10 of the invention further comprises an alignment means. As depicted in FIG. 7, shingles 10A, 10B may further include sealant strips 6 that operate as an alignment means, wherein the sealant strips 6 on a previously installed shingle 10A and the sealant strips 6 on a subsequently installed shingle 10B create a straight line that continues across a same elevation alignment region 71 that spans adjacent shingles in the same course. It will further be appreciated that the abutment region 74 may provide alignment and installation assistance for the installer by acting as a fulcrum between the stationary previously installed shingle and the subsequent shingle to be installed.

FIG. 7 also depicts an alignment means between a shingle 10C of the invention in a subsequently installed course of shingles and two shingles 10A, 10B of the invention in a previously installed or first course of shingles. A third shingle 10C of the invention is installed in a subsequent course and overlaps the headlap portions 2 of the shingles 10A, 10B of the invention in the first course. The left and right horizontal portions, e.g., features 7z and 7z', of the non-straight longitudinal front edge 7 of shingle 10C of the invention in the subsequent course align with the sealant strips 6 of a shingles 10A, 10B of the invention in the first course. In this embodiment, the left and right horizontal portions 7z, 7z' of the non-straight longitudinal front edge 7 are about flush with (or slightly extend over) the front edge of the sealant strips 6 of shingles 10A, 10B in the first course. Although the accompanying figures depict sealant strips 6 arranged in clean straight lines, it will be appreciated that the actual sealant strips placed onto the shingles may not have a perfectly straight line appearance; however, the alignment principles disclosed herein are still applicable. Additional or alternative means of aligning subsequently installed shingles are also contemplated, such as alignment notches, slits, or marks on the lateral edges of subsequently installed shingles. Referring to FIG. 7A, shingles 10'A, 10'B, 10'C are arranged in a fashion similar to that depicted in FIG. 7. Shingles 10'A, 10'B, 10'C further comprise alignment slits 175, 176, wherein the alignment slits 175, 176 of a subsequently installed shingle 10'C align with the longitudinal rear edge 8 of previously installed shingles 10'A, 10'B at alignment regions 75, 76.

Referring to FIG. 7B, at a first trailing overlap region 90, the underside of shingle 10D near the first trailing portion 74A of shingle 10D is sealed to sealant strips 6 of shingle 10B. The trailing edge projection 100 of shingle 10D may be sealed directly to sealant strips 6 of a previously installed shingle 10C at the second trailing overlap region 91. It will be further appreciated that, in preferred embodiments, subsequently installed shingles, e.g., shingle 10E in FIG. 7B, provide material overlap in the second trailing overlap region 91 such that three layers of roofing material are present at this region of the ship-lap joint.

Although the embodiments depicted in the accompanying figures have sealant strips 6 on the upper surface of the shingles, it is contemplated that, alternatively, sealant strips may be affixed to the underside surface of the shingles proximate to the longitudinal front edge 7 (not shown).

In a particularly preferred embodiment of the roofing system of the invention, shingles of the invention may be installed such that a minimum of 4 inches of a side-lap overlap exists at any water entry point. However, it is contemplated that the minimum side-lap overlap may be 2 inches at any water entry point.

For one embodiment of the present invention, the shingle 10 may be formed from a fiberglass mat (not shown) with an asphalt coating on both sides of the mat. If desired, the present invention may also be used with shingles formed from organic felt or other types of base material, including but not limited to synthetic mats or synthetic glass/hybrid mats having an appropriate coating. Nonlimiting embodiments of coatings include asphalt and modified bituminous coatings based on atactic polypropylene (APP), styrene-butadiane-styrene (SBS), styrene-ethylene-butadiene-styrene (SEBS), amorphous polyalpha olefin (APAO), thermoplastic polyolefin (TPO), synthetic rubber, their combinations or other asphaltic modifiers.

Referring to FIG. 1, the exposed outer surface or weather surface, i.e., the buttlap portion 3 of shingle 10 of the invention, may be coated with various types of mineral granules to protect the asphalt coating, to add color to shingle 10 of the invention and to provide fire resistance. For some applications, ceramic-coated mineral granules may be disposed on the top surface of the buttlap portion 3. Also, a wide range of mineral colors from white and black to various shades of red, green, brown and any combination thereof may be used to provide a roof having the desired color for shingle 10 of the invention. In other embodiments, the entire outer surface of shingle 10 of the invention may be coated with any of the aforementioned coatings. In further embodiments, e.g., shingles having partially exposed headlap portions, the headlap portion 2 of shingle 10 of the invention may be coated with coatings having a first shade of granules that contrast with coatings having a second shade of granules applied to the buttlap portion 3 of shingle 10 of the invention. In these embodiments, the contrasting colors of the exposed headlap portion and the buttlap portion may create a perceived increase in shingle depth. This visual effect may be further enhanced by surfacing a portion of the front-most part of the buttlap portion, e.g., buttlap tabs, with a third shade of granules, and further yet when the first shade of granules is the darkest of the three shades and the third shade of granules is the lightest of the three shades. The underside of shingle 10 of the invention may be coated with various inert minerals with sufficient consistency to seal the asphalt coating.

An important feature of the present invention includes providing a shingle having a reduced-width headlap portion. For preferred embodiments of the present invention, headlap portion 2 may have a width that is about 25% or about 38% or about 42% of the width (w) of shingle 10 of the invention. However, as noted above, the headlap portion 2 may have a width that is between 15% and 50% of the width (w) of shingle 10 of the invention.

Another important feature of the present invention includes providing a shingle having interlocking edges. For the embodiments of the present invention shown in the instant figures, the lateral trailing edge 4 and the lateral leading edge 5 of adjacent installed shingles in the same course partially overlap, partially underlap, and partially abut, thereby forming an interlocking edge between the adjacent installed shingles. However, other forms of interlocking edges are contemplated including, but not limited to, cutouts or holes in various geometric shapes and their combinations.

Another important feature of the present invention includes providing a shingle with a side-lap edge (a trailing edge projection 100) having a variable breadth that increases toward a rear edge of the trailing edge projection. For the embodiment of the present invention shown in the instant figures, trailing edge projection 100 has a straight edge portion 102$x$ and a curved portion 102$y$. However, other shapes and dimensions for the trailing edge projection 100 that dissipate wind impingements underneath the side-lap edge are contemplated and within the scope of the present invention, e.g., embodiments of the present invention may have a trailing edge projection having a continuously curved shape.

The reduced-width headlap portion and the unique shape and/or dimensions of the shingle of the present invention are desirable because they allow for an improved utilization of materials that are required to make the shingles. In preferred embodiments of this invention, the shingles and roof system of the present invention improve the material utilization over traditional, prior art 3-tab shingles preferably by at least 15% (less than 200 ft$^2$ of material needed for 100 ft$^2$ of coverage), and more preferably by about 23% (about 186 ft$^2$ of material needed for 100 ft$^2$ of coverage), or about 25% (about 181 ft$^2$ of material sheet needed for 100 ft$^2$ of coverage), or about 29% (about 171 ft$^2$ of material needed for 100 ft$^2$ of coverage).

The interlocking edges of the present invention are desirable for improving alignment upon installation and increased resistance to water infiltration.

The trailing edge projection 100 having a variable breadth that increases toward a rear edge of the trailing edge projection of the present invention is desirable for increasing resistance to wind impingements at or near the side-lap region.

The interlocking edges and the trailing edge projection 100 of the present invention are further desirable because they allow for improved weather performance. In preferred embodiments of this invention, the shingles and roofing system of the present invention reduce the % area of water infiltration over traditional, prior art 3-tab shingles by at least 10%, and more preferably by at least 15%, and yet more preferably by 20%. The % area of water infiltration is determined by the area of water wetting in the underlayment upon testing per Miami Dade TAS 100 wind-driven rain test.

EXAMPLE

Shingles having length (l) and width (w) dimensions of 36"×12", a reduced-width headlap and a trailing edge projection in accordance with the invention and a straight front longitudinal edge were prepared by following a typical reduced-headlap shingle production. A 4'×4' test roof deck was constructed, wherein shingles of the invention were installed in accordance with the invention. The interlocking edge between adjacent shingles in the same course included a side-lap region having a maximum length of 6" and a first abutment region and a second abutment region each having a height of 2". The weather edge of the side-lap included a curved edge designed to provide wind dynamics for uplift reduction. A 4'×4' control roof deck was constructed, wherein commercially available 3-tab shingles (Royal Sovereign shingle from GAF Corporation, Dallas, Tex.) were installed. Table 1 (below) lists the amount of shingle material needed per 100 ft$^2$ based upon the deck construction calculation. As will be appreciated, the shingles of the invention have significantly better material utilization with an approximately 33% reduction in material usage comparing to the prior art, control 3-tab shingles.

Both decks were then subjected to the Miami Dade TAS 100 wind-driven rain test, which includes wind-driven rain conditions at 35, 70, 90, and 110 mph wind. After the test, the shingles were removed and the water infiltration was observed. The amounts of wet area were recorded and estimated to within ±5% of the total area, and listed in Table 1 (below). As will be appreciated, the shingles of the invention can significantly reduce the amount of water infiltration when compared to traditional, prior art 3-tab shingles.

TABLE 1

| Sample | Area needed to cover 100 ft$^2$ | % area of water infiltration |
|---|---|---|
| Control: 3-tab shingles | 240 | 20% |
| Test sample | 160 | 5% |

Although the present invention and its advantages have been described in detail, it should be understood that various changes, substitutions and alterations can be made therein without departing from the spirit and scope of the invention as defined by the appended claims.

What is claimed is:

1. A roofing system comprising:
    single-layer shingles having a headlap portion, a buttlap portion, a lateral leading edge, a lateral trailing edge, a straight longitudinal rear edge, and a non-straight longitudinal front edge;
    wherein said headlap portion has a maximum headlap width that is less than a maximum buttlap width of said buttlap portion;
    wherein said lateral leading edge includes at least one leading abutting portion and a leading edge projection that extends away from the shingle;
    wherein said lateral trailing edge includes at least one trailing abutting portion and a trailing edge projection that extends away from the shingle;
    wherein the roofing system comprises a plurality of courses of the shingles, and wherein the lateral trailing edge of a subsequently installed shingle in a first course of shingles partially abuts and partially overlaps the lateral leading edge of an adjacent previously installed shingle in the first course of shingles to form an interlocking edge between adjacent shingles in the first course of shingles;

wherein the leading edge projection has a projected edge, a rear edge, and a variable breadth that increases toward the rear edge of the leading edge projection;

wherein the trailing edge projection has a weather edge, a rear edge, and a variable breadth that increases toward the rear edge of the trailing edge projection;

wherein the leading edge projection mirrors the trailing edge projection;

and wherein the straight longitudinal rear edge comprises a leading portion and a trailing portion separated by a central portion, wherein the leading portion consists of the rear edge of the leading edge projection and the trailing portion consists of the rear edge of the trailing edge projection.

2. The roofing system according to claim 1, wherein the lateral leading edge includes one leading abutting portion;

wherein the lateral trailing edge includes one trailing abutting portion;

and wherein the interlocking edge comprises an abutment region defined by an abutment of the leading abutting portion and the trailing abutting portion of the adjacent shingles in the first course of shingles and a side-lap region defined by an overlap of the trailing edge projection and an underlap of the leading edge projection between the adjacent shingles in the first course of shingles.

3. The roofing system according to claim 2, wherein the side-lap region has a maximum breadth that is about 5 inches.

4. The roofing system according to claim 1, wherein the trailing edge projection has a curved portion and a straight lateral portion.

5. The roofing system according to claim 1, wherein the non-straight longitudinal front edge includes a central horizontal portion, a left horizontal portion, a right horizontal portion, a first transition portion, and a second transition portion, wherein the central horizontal portion extends further away from the shingle than the left horizontal portion and the right horizontal portion, and wherein the first transition portion is situated between the left horizontal portion and the central horizontal portion and the second transition portion is situated between the central horizontal portion and the right horizontal portion.

6. A roofing shingle comprising:
a headlap portion, a buttlap portion, a lateral leading edge, a lateral trailing edge, a straight longitudinal rear edge, and a non-straight longitudinal front edge;
wherein said shingle is a single-layer shingle;
wherein said headlap portion has a headlap width that is less than a maximum buttlap width of said buttlap portion;
wherein said lateral leading edge includes at least one leading abutting portion and a leading edge projection that extends away from the shingle;
wherein said lateral trailing edge includes at least one trailing abutting portion and a trailing edge projection that extends away from the shingle;
wherein the leading edge projection has a projected edge, a rear edge, and a variable breadth that increases toward the rear edge of the leading edge projection;
wherein the trailing edge projection has a weather edge, a rear edge, and a variable breadth that increases toward the rear edge of the trailing edge projection;
and wherein the leading edge projection mirrors the trailing edge projection.

7. The roofing shingle according to claim 6, wherein the trailing edge projection has a curved portion and a straight lateral portion.

8. The roofing shingle according to claim 6, wherein the non-straight longitudinal front edge includes a central horizontal portion, a left horizontal portion, a right horizontal portion, a first transition portion, and a second transition portion, wherein the central horizontal portion extends further away from the shingle than the left horizontal portion and the right horizontal portion, and wherein the first transition portion is situated between the left horizontal portion and the central horizontal portion and the second transition portion is situated between the central horizontal portion and the right horizontal portion.

9. A roofing system comprising:
single-layer shingles having a headlap portion, a buttlap portion, a lateral leading edge, and a lateral trailing edge;
wherein said headlap portion has a maximum headlap width that is less than a maximum buttlap width of said buttlap portion;
wherein said lateral leading edge includes at least one leading abutting portion and a leading edge projection that extends away from the shingle;
wherein said lateral trailing edge includes at least one trailing abutting portion and a trailing edge projection that extends away from the shingle;
wherein the roofing system comprises a plurality of courses of the shingles, and wherein the lateral trailing edge of a subsequently installed shingle in a first course of shingles partially abuts and partially overlaps the lateral leading edge of an adjacent previously installed shingle in the first course of shingles to form an interlocking edge between adjacent shingles in the first course of shingles;
wherein the trailing edge projection has a weather edge, a rear edge, and a variable breadth that increases toward the rear edge of the trailing edge projection;
wherein the leading edge projection mirrors the trailing edge projection;
and wherein the buttlap portion includes a plurality of tabs separated by a plurality of openings.

10. The roofing system according to claim 9, wherein the at least one leading abutting portion includes a first leading portion and a second leading portion that are separated by the leading edge projection;
wherein the at least one trailing abutting portion includes a first trailing portion and a second trailing portion that are separated by the trailing edge projection;
and wherein the interlocking edge comprises a first abutment region defined by an abutment of the first leading portion and the first trailing portion of the adjacent shingles in the first course of shingles, a side-lap region defined by an overlap of the trailing edge projection and an underlap of the leading edge projection between the adjacent shingles in the first course of shingles, and a second abutment region defined by an abutment of the second leading portion and the second trailing portion in the first course of shingle.

11. The roofing system according to claim 10, wherein the side-lap region has a maximum breadth that is about 5 inches.

12. The roofing system according to claim 9, wherein the lateral leading edge includes one leading abutting portion;
wherein the lateral trailing edge includes one trailing abutting portion;
wherein the interlocking edge comprises an abutment region defined by an abutment of the leading abutting portion and the trailing abutting portion of the adjacent shingles in the first course of shingles and a side-lap region defined by an overlap of the trailing edge projection and an underlap of the leading edge projection between the adjacent shingles in the first course of shingles;

wherein the leading edge projection has a projected edge, a rear edge, and a variable breadth that increases toward the rear edge of the leading edge projection;

and wherein the shingles further comprise a straight longitudinal rear edge comprising a leading portion and a trailing portion separated by a central portion, wherein the leading portion consists of the rear edge of the leading edge projection and the trailing portion consists of the rear edge of the trailing edge projection.

13. The roofing system according to claim 12, wherein the side-lap region has a maximum breadth that is about 5 inches.

14. The roofing system according to claim 9, wherein the trailing edge projection has a curved portion and a straight lateral portion.

15. The roofing system according to claim 9, wherein the openings have a trapezoidal shape.

16. The roofing system according to claim 9, wherein the openings have a triangular shape.

17. A roofing shingle comprising:
a headlap portion, a buttlap portion, a lateral leading edge, and a lateral trailing edge;
wherein said shingle is a single-layer shingle;
wherein said headlap portion has a maximum headlap width that is less than a maximum buttlap width of said buttlap portion;
wherein said lateral leading edge includes at least one leading abutting portion and a leading edge projection that extends away from the shingle;
wherein said lateral trailing edge includes at least one trailing abutting portion and a trailing edge projection that extends away from the shingle;
wherein the trailing edge projection has a weather edge, a rear edge, and a variable breadth that increases toward the rear edge of the trailing edge projection;
wherein the leading edge projection mirrors the trailing edge projection;
and wherein the buttlap portion includes a plurality of tabs separated by a plurality of openings.

18. The roofing shingle according to claim 17, wherein the at least one leading abutting portion includes a first leading portion and a second leading portion that are separated by the leading edge projection;

and wherein the at least one trailing abutting portion includes a first trailing portion and a second trailing portion that are separated by the trailing edge projection.

19. The roofing shingle according to claim 17, wherein the leading edge projection has a projected edge, a rear edge, and a variable breadth that increases toward the rear edge of the leading edge projection;

and wherein the shingles further comprise a straight longitudinal rear edge comprising a leading portion and a trailing portion separated by a central portion, wherein the leading portion consists of the rear edge of the leading edge projection and the trailing portion consists of the rear edge of the trailing edge projection.

20. The roofing shingle according to claim 17, wherein the trailing edge projection has a curved portion and a straight lateral portion.

21. The roofing shingle according to claim 17, wherein the openings have a trapezoidal shape.

22. The roofing shingle according to claim 17, wherein the openings have a triangular shape.

* * * * *